(12) United States Patent  
Decoux et al.

(10) Patent No.: US 11,875,589 B2  
(45) Date of Patent: Jan. 16, 2024

(54) ARTICLE DUAL MATERIAL-DIGITAL ANTI-FORGERY PROTECTION

(71) Applicant: SICPA HOLDING SA, Prilly (CH)

(72) Inventors: Eric Decoux, Vevey (CH); Philippe Gillet, Pully (CH); Philippe Thevoz, Penthalaz (CH); Elisabeth Wallace, Pully (CH)

(73) Assignee: SICPA HOLDING SA, Prilly (CH)

( * ) Notice: Subject to any disclaimer, the term of this patent is extended or adjusted under 35 U.S.C. 154(b) by 559 days.

(21) Appl. No.: 17/254,712

(22) PCT Filed: Jun. 3, 2019

(86) PCT No.: PCT/EP2019/064366  
§ 371 (c)(1),  
(2) Date: Dec. 21, 2020

(87) PCT Pub. No.: WO2019/243033  
PCT Pub. Date: Dec. 26, 2019

(65) Prior Publication Data  
US 2021/0117671 A1 Apr. 22, 2021

(30) Foreign Application Priority Data  
Jun. 19, 2018 (EP) .................................. 18178639

(51) Int. Cl.  
*G06V 30/418* (2022.01)  
*G06F 16/22* (2019.01)  
(Continued)

(52) U.S. Cl.  
CPC ............ *G06V 30/418* (2022.01); *G06F 16/22* (2019.01); *G06F 16/24556* (2019.01);  
(Continued)

(58) Field of Classification Search  
CPC ... G06F 16/22; G06F 16/24556; G06V 20/80; G06V 20/95; G06V 30/418; H04L 9/3247; H04L 9/3278  
See application file for complete search history.

(56) References Cited

U.S. PATENT DOCUMENTS

| | | | | |
|---|---|---|---|---|
| 2004/0153653 | A1* | 8/2004 | Abhyankar | ......... G06F 21/6209 713/179 |
| 2007/0168672 | A1* | 7/2007 | Izu | ........................ H04L 9/3073 713/176 |

(Continued)

FOREIGN PATENT DOCUMENTS

| | | |
|---|---|---|
| JP | 200871338 | 3/2008 |
| JP | 2010157784 | 7/2010 |

OTHER PUBLICATIONS

Benaloh J et. al.: "One-way Accumulators: A Decentralized Alternative to Digital Signatures (Extended Abstract)", Electronic publishing, Artistic Imaging, and digital typogr; [Lecture notes in computer science, ISSN 0302-9743], Springer Verlag, de, vol. 765, May 23, 1993 (May 23, 1993), pp. 274-285, XP008066935, ISBN: 978-3-540-24128-7, (Abstract, Section 1-3 and 5.2).

(Continued)

*Primary Examiner* — Ruiping Li  
(74) *Attorney, Agent, or Firm* — Muncy, Geissler, Olds & Lowe, P.C.

(57) ABSTRACT

The invention relates to securing of an article against forgery and falsifying of its associated data, and particularly of data relating to its belonging to a specific batch of articles, while allowing offline or online checking of the authenticity of a secured article and conformity of its associated data with respect to that of a genuine article.

20 Claims, 5 Drawing Sheets

(51) Int. Cl.
  *G06F 16/2455* (2019.01)
  *H04L 9/32* (2006.01)
  *G06V 20/80* (2022.01)
  *G06V 20/00* (2022.01)

(52) U.S. Cl.
  CPC ............ *G06V 20/80* (2022.01); *H04L 9/3247* (2013.01); *G06V 20/95* (2022.01)

(56) References Cited

U.S. PATENT DOCUMENTS

| | | | |
|---|---|---|---|
| 2010/0169653 | A1 | 7/2010 | Takenaka et al. |
| 2011/0052096 | A1 | 3/2011 | Piersol et al. |
| 2012/0125997 | A1* | 5/2012 | Burra .................... G06K 19/10 235/494 |
| 2016/0277190 | A1 | 9/2016 | Soldevila et al. |

OTHER PUBLICATIONS

Anonymous: "One way function—Disadvantages of one-way accumulators?—Cryptography Stack Exchange" Apr. 12, 2014 (Apr. 12, 2014), XP055528937.

Kumar Amrit et. al.:"Performances of cryptographic accumulators" 39th Annual IEEE Conference on local computer networks, IEEE, Sep. 8, 2014 (Sep. 8, 2014), pp. 366-369, XP032661315, DOI: 10.1109/LCN.2014.6925793, (the whole document).

Derler David et. al.: "Revisiting Cryptographic Accumulators, Additional properties and relations to other primitives", Mar. 11, 2015 (Mar. 11, 2015), International conference on simulation, modeling, and programming for autonomous robots, SIMPAR 2010, [Lecture notes in computer science; Lect. notes computer], Springer, Berlin, Heidelberg, pp. 127-144, XP047352728, ISBN: 978-3-642-17318-9, [retrieved on Mar. 11, 2015], (the whole document).

S. Goldwasser and M. Bellare: "Lecture Notes on Cryptography", MIT, Jul. 2008, 289 pages.

International Search Report and Written Opinion of the ISA issued with respect to application No. PCT/EP2019/064366.

Japan Patent Office Action in counterpart Japanese Application No. JP2020-569733 dated Jun. 13, 2023 (and English language translation of Office Action).

* cited by examiner

ARTICLE DUAL MATERIAL-DIGITAL ANTI-FORGERY PROTECTION

TECHNICAL FIELD

The present invention relates to the technical field of protection of articles and data marked on such articles against forgery or tampering, as well as of conformity of digital images of such marked articles with the original ones, and traceability of articles.

BACKGROUND ART

From mechanical parts, electronic components, pharmaceutics, and countless other articles, the problems of counterfeiting and tampering are well known, serious, and growing. Moreover, tampering of data associated with an article is also a serious concern. The example of falsifying data marked on an original printed document such as an identity document or a diploma (article) is well known, and the concern is even worse if considering a digital copy or a photocopy of the original (possibly genuine) document. Simply keeping track of identifiers such as serial numbers is in general an insufficient response, because counterfeiters can easily copy such numbers as well.

There are many other security schemes for articles of manufacture but they typically do not provide a sufficient level of security, they have too high an administrative overhead in terms of information that must be stored and accessed, they are often impractical for use except in well-controlled environments, or they simply cannot be implemented physically. For example, many schemes for digitally securing documents in a verifiable manner are not suitable for use in contexts that involve many physical items on which it is impractical or otherwise undesirable to mark them with corresponding signatures.

One other drawback of most conventional methods for insuring the authenticity of articles, or securing their associated data, is that they tend to view articles in isolation, even if they are members of a well-defined group such as a production batch for example. This ignores valuable authenticating information.

A conventional way of securing an article is to apply on it a material-based security marking (possibly tamperproof), i.e. a marking having detectable intrinsic physical or chemical property that is very hard (if not impossible) to reproduce. If an appropriate sensor detects this intrinsic property on a marking, this marking is then considered as genuine with a high degree of confidence, and thus also the corresponding marked article. There are many examples of such known authenticating intrinsic properties: the marking can include some particles, possibly randomly dispersed, or has a specific layered structure, having intrinsic optical reflection or transmission or absorption or even emission (luminescence, for example, or polarization or diffraction or interference . . . ) properties, possibly detectable upon specific illumination conditions with "light" of specific spectral content. This intrinsic property can result from the specific chemical composition of the material of the marking: for example, luminescent pigments (possibly not commercially available) can be dispersed in an ink used for printing some pattern on the article and are used to emit specific light (for example, in a spectral window within the infrared range) upon illumination with a specific light (for example, with light in the UV spectral range). This is used for securing banknotes, for example. Other intrinsic properties can be used: for example, the luminescent particles in the marking can have a specific luminescence emission decay time after illumination with an appropriate excitation light pulse. Other types of intrinsic properties are the magnetic property of included particles, or even a "fingerprint" property of the article itself such as, for example, the relative positioning of inherently randomly dispersed fibers of a paper substrate of a document, in a given zone on the document, which, when observed at sufficient resolution, can serve to extract a unique characterizing signature, or some random printing artefacts of data printed on the article which, viewed with sufficient magnification, can also lead to a unique signature etc. . . . . . The main problem with an inherent fingerprint property of an article is its robustness with respect to aging or wear. However, a material-based security marking does not always allow also securing data associated with the marked article: for example, even if a document is marked with a material-based security marking like a logo printed with a security ink in some zone of the document, data printed on the remaining part of the document can still be falsified. Moreover, too complex authenticating signatures often necessitate significant storage capabilities involving external databases, and communication links for querying such databases, so that offline authentication of an article is not possible.

It is therefore an object of the invention to secure an article against forgery and falsifying of its associated data, and particularly of data relating to its belonging to a specific batch of articles. It is also an object of the invention to allow offline checking of the authenticity of an object secured according to the invention and conformity of its associated data with respect to that of a genuine object.

SUMMARY OF THE INVENTION

One aspect of the invention relates to a method of securing a given original article of a batch of a plurality of original articles against forgery or tampering, each original article of the batch having its own associated article data and corresponding article digital data, comprising the steps of:

for each original article of the batch, calculating by means of a one-way function an associated article digital signature of its corresponding article digital data;

calculating a reference aggregated digital signature corresponding to the batch of original articles from all the article digital signatures of the original articles of the batch by means of a one-way accumulator of said article digital signatures, and making available to a user the reference aggregated digital signature;

determining an article verification key corresponding to the article digital signature of said given original article by means of a partial one-way accumulator of the other article digital signatures used for calculating the reference aggregated digital signature, whereby a candidate article digital signature corresponds to that of an original article of the batch only if the reference aggregated digital signature is retrieved from the one-way function of said candidate article digital signature and corresponding article verification key; and applying on the given original article a corresponding machine readable article security marking including a representation of its associated article digital data and its corresponding article verification key, thereby obtaining a marked original article of which article data is secured against forgery or tampering.

The reference aggregated digital signature associated with the batch of original articles may either be published in a media accessible to the user, or stored in a searchable aggregated signature database accessible to the user, or stored in a blockchain, or in a database secured by a blockchain, accessible to the user. Moreover, the marked original article may further comprise aggregated signature access data marked thereto and containing information sufficient to access to the reference aggregated digital signature corresponding to the batch of original articles, said information being a link to an aggregated signature acquisition interface of, respectively, one of the following:

- the media wherein the reference aggregated digital signature is published, the media being accessible to the user via said aggregated signature acquisition interface operable to receive from the user an aggregated signature request containing article data, or a digital signature of said article data, obtained from a security marking of a marked original article, and send back a reference aggregated digital signature of associated batch;
- the searchable aggregated signature database wherein the reference aggregated digital signature is stored, the aggregated signature database being accessible to the user via said aggregated signature acquisition interface operable to receive from the user an aggregated signature request containing article data, or a digital signature of said article data, obtained from a security marking of a marked original article, and send back a reference aggregated digital signature of associated batch;
- the blockchain, respectively the database secured by the blockchain, wherein the time-stamped aggregated digital signature is stored, the blockchain, respectively the database secured by the blockchain, being accessible to the user via said aggregated signature acquisition interface operable to receive from the user an aggregated signature request containing article data, or a digital signature of said article data, obtained from a security marking of a marked original article, and send back a reference aggregated digital signature of associated batch.

According to the invention, a virtual article may be included into the batch of original articles, said virtual article having associated virtual article data and its corresponding virtual article digital data, and an associated virtual article digital signature obtained by means of the one-way function, said virtual article being not produced but only used for generating the associated virtual article digital signature from the corresponding virtual article digital data; the reference aggregated digital signature associated with said batch of original articles being calculated from all the article digital signatures of the original articles of the batch, including the virtual article digital signature, by means of the one-way accumulator.

The one-way function may be a hash function and an article digital signature of an original article may be a sequence of a given plurality of bits of lower weights selected from the bits of a hash value of the corresponding article digital data.

In the above method, additional article digital data corresponding to the article data associated with the marked original article may be stored in a searchable information database accessible to the user via an information database interface operable to receive from the user an information request containing article data, or corresponding digital signature data, obtained from a security marking of a marked original article, and send back corresponding additional article digital data.

The marked original article may further comprise a corresponding article data marking applied thereto, said article data marking including the corresponding article data associated with said marked original article.

The article digital data of the marked original article may include reference physical characteristic digital data UPC of a corresponding unique physical characteristic of the marked original article, or of an associated object or individual. Moreover, the unique physical characteristic of the marked original article may be that of a material-based security marking applied on the original article.

Another aspect of the invention relates to a method of verifying the authenticity of an article secured according to the above mentioned method of securing an original article, or the conformity of a copy of such secured article with respect to the original one, comprising the steps of, upon viewing a test object being said article or said copy of the article:

- acquiring a digital image of the security marking on the test object by means of an imager having an imaging unit, a CPU with a memory, and an image processing unit;
- reading a representation of article digital data and of an associated article verification key on the acquired digital image of the security marking on the test object, and extracting respectively corresponding article digital data and article verification key from said read representation;
- having stored in the memory a reference aggregated digital signature of a corresponding batch of articles, and having programmed in the CPU the one-way function and the one-way accumulator;
- verifying that the extracted article digital data and associated article verification key indeed correspond to the stored reference aggregated digital signature by performing the steps of:
- calculating a digital signature of the extracted article digital data with the one-way function;
- calculating a candidate aggregated digital signature from the calculated digital signature of the extracted article digital data and the extracted article verification key with the one-way accumulator; and
- checking that the obtained candidate aggregated digital signature matches the stored reference aggregated digital signature,
- whereby, in case said aggregated digital signatures match, the article data on the test object is that of a genuine original article.

The verification method, wherein the article is secured by storing the reference aggregated digital signature associated with batch of original articles in a searchable aggregated signature database accessible to the user, and wherein the imager is further equipped with a communication unit operable to send and receive back data via a communication link, may comprise the preliminary steps of:

- sending with the communication unit via the communication link a request to said aggregated signature database, and receiving back the reference aggregated digital signature associated with batch of original articles; and
- storing the received aggregated digital signature in the memory of the imager.

In the verification method, the article may be secured by including aggregated signature access data as mentioned above and the imager may be further equipped with a communication unit operable to send and receive back data via a communication link, the verification method comprising the preliminary steps of:
  reading the aggregated signature access data marked on the test object with the imager;
  sending with the communication unit via the communication link an aggregated signature request to said aggregated signature acquisition interface containing the article data, or a digital signature of said article data, obtained from the security marking on the test object, and receiving back a corresponding reference aggregated digital signature of associated batch; and
  storing the received aggregated digital signature in the memory of the imager.

The article may be secured with additional article data as mentioned above, and the imager may further be equipped with communication means operable to send to the information database interface an information request containing article data, or corresponding digital signature data, obtained from the security marking on the test object, and receive back corresponding additional article digital data.

The article may be secured with an article data marking as mentioned above, the verification method comprising the further steps of:
  reading article data marked on an article data marking on the test object with the imager; and
  checking that the article data read from the article data marking correspond with the article digital data extracted from the security marking on the test object.

The article may be secured with an article data marking and may further have a material-based security marking as mentioned above, and the imager may further be equipped with a sensor operable to detect a unique physical characteristic of a marked original article, or of an associated object or individual, and the CPU is programmed to extract corresponding unique physical characteristic digital data from a detection signal received from the sensor, the imager having stored in the memory reference physical characteristic digital data UPC corresponding to said unique physical characteristic of the marked original article, or of the associated object or individual, comprising the further steps of, upon viewing a subject being said article or said associated object or individual:
  detecting with the sensor a unique physical characteristic of the subject and extracting corresponding candidate unique physical characteristic digital data $UPC^c$;
  comparing the obtained candidate unique physical characteristic digital data $UPC^c$ with the stored reference physical characteristic digital data UPC; and
  in case the candidate unique physical characteristic digital data $UPC^c$ is similar to the stored reference physical characteristic digital data UPC, within a given tolerance criterion, the subject is considered as genuine.

Another aspect of the invention relates to a method of verifying the conformity of an article digital image of an original article secured according to the above mentioned method with respect to the marked original article, comprising the steps of:
  receiving the article digital image showing the security marking on the original article by means of an imager having an imaging unit, a CPU with a memory, and an image processing unit;
  reading a representation of article digital data and of an associated article verification key on the acquired digital image of the security marking, and extracting respectively corresponding article digital data and article verification key from said read representation;
  having stored in the memory a reference aggregated digital signature of a corresponding batch of articles, and having programmed in the CPU the one-way function and the one-way accumulator;
  verifying that the extracted article digital data and associated verification key indeed correspond to the stored reference aggregated digital signature by performing the steps of:
  calculating a digital signature of the extracted article digital data with the one-way function;
  calculating a candidate aggregated digital signature from the calculated digital signature of the extracted article digital data and the extracted verification key with the one-way accumulator; and
  checking that the obtained candidate aggregated digital signature matches the stored reference aggregated digital signature,
  whereby, in case said aggregated digital signatures match, the article data on the article digital image is that of a genuine original article.

The article may be secured by storing the reference aggregated digital signature associated with batch of original articles in a searchable aggregated signature database accessible to the user as explained above, and the imager may further be equipped with a communication unit operable to send and receive back data via a communication link, the conformity verifying method comprising the preliminary steps of:
  sending with the communication unit via the communication link a request to said aggregated signature database, and receiving back the reference aggregated digital signature associated with batch of original articles; and
  storing the received aggregated digital signature in the memory of the imager.

In a variant, the article may be secured with aggregated signature access data as mentioned above, and the imager may further be equipped with a communication unit operable to send and receive back data via a communication link, the conformity verifying method comprising the preliminary steps of:
  reading the aggregated signature access data with the imager on the received article digital image showing access data marked on the article;
  sending with the communication unit via the communication link an aggregated signature request to said aggregated signature acquisition interface containing the article data, or a digital signature of said article data, obtained from the image of security marking on the article, and receiving back a corresponding reference aggregated digital signature of associated batch; and
  storing the received aggregated digital signature in the memory of the imager.

The article may be secured with an article data marking as explained above, and the method of verifying the conformity of the article digital image may comprise the further steps of:
  reading article data marked on an article data marking on the received article digital image with the imager; and
  checking that the article data read from the digital image of the article data marking correspond with the article digital data extracted from the security marking on the received article digital image.

According to still another aspect, the invention relates to a marked article belonging to a batch of a plurality of original articles and secured against forgery or tampering according to the above mentioned method, each original article of the batch having its own associated article data and corresponding article digital data, said batch having a corresponding reference aggregated digital signature, comprising:
- a machine readable security marking applied on it and including a representation of its associated article digital data and a corresponding article verification key.

The article digital data of the marked article may include reference physical characteristic digital data UPC of a corresponding unique physical characteristic of the marked article, or of an associated object or individual.

The unique physical characteristic of the marked article may be that of a material-based security marking applied on the marked article.

The invention further relates to a system for verifying the authenticity of a marked original article secured according to the above mentioned securing method, or the conformity of a copy of such article with respect to the original one, comprising an imager having an imaging unit, a CPU with a memory, and an image processing unit, the memory storing a reference aggregated digital signature of a corresponding batch of articles, and the one-way function and the one-way accumulator being programmed in the CPU, operable to:
- acquire a digital image of the security marking on a test object being said article or said copy of the article;
- read a representation of article digital data and of an associated article verification key on the acquired digital image of the security marking on the test object, and extract respectively corresponding article digital data and article verification key from said read representation;
- verify that the extracted article digital data and associated verification key indeed correspond to the stored reference aggregated digital signature by executing on the CPU the further programmed steps of:
- calculating a digital signature of the extracted article digital data with the one-way function;
- calculating a candidate aggregated digital signature from the calculated digital signature of the extracted article digital data and the extracted verification key with the one-way accumulator; and
- checking that the obtained candidate aggregated digital signature matches the stored reference aggregated digital signature,
- whereby, in case said aggregated digital signatures match, the system is operable to deliver an indication that the article data on the test object is that of a genuine original article.

In the above system, for verifying an article secured with reference physical characteristic digital data UPC, that may relate to a material-based security marking as explained above, the imager may further be equipped with a sensor operable to detect a unique physical characteristic of a marked original article, or of an associated object or individual, and the CPU is programmed to extract corresponding unique physical characteristic digital data from a detection signal received from the sensor, the imager having stored in the memory reference physical characteristic digital data UPC corresponding to said unique physical characteristic of the marked original article, or of associated object or individual, the system being further operable to:
- detect with the sensor a unique physical characteristic of a subject being said article or said associated object or individual, and extract corresponding candidate unique physical characteristic digital data $UPC^c$;
- compare the obtained candidate unique physical characteristic digital data $UPC^c$ with the stored reference physical characteristic digital data UPC; and
- in case the candidate unique physical characteristic digital data $UPC^c$ is similar to the stored reference physical characteristic digital data UPC, within a given tolerance criterion, deliver an indication that the subject is considered as genuine.

The invention also relates to a system for verifying the conformity of an article digital image of an original article secured according to the above mentioned securing method, with respect to the marked original article, comprising an imager having an imaging unit, a CPU with a memory, and an image processing unit, the memory storing a reference aggregated digital signature of a corresponding batch of articles, and the one-way function and the one-way accumulator being programmed in the CPU, operable to:
- receive the article digital image showing the security marking on the original article;
- read a representation of article digital data and of an associated article verification key on the acquired digital image of the security marking, and extract respectively corresponding article digital data and article verification key from said read representation;
- verify that the extracted article digital data and associated verification key indeed correspond to the stored reference aggregated digital signature by executing on the CPU the further programmed steps of:
- calculating a digital signature of the extracted article digital data with the one-way function;
- calculating a candidate aggregated digital signature from the calculated digital signature of the extracted article digital data and the extracted verification key with the one-way accumulator; and
- checking that the obtained candidate aggregated digital signature matches the stored reference aggregated digital signature,
- whereby, in case said aggregated digital signatures match, the system is operable to deliver an indication that the article data on the article digital image is that of a genuine original article.

The present invention will be described more fully hereinafter with reference to the accompanying drawings in which prominent aspects and features of the invention are illustrated.

DETAILED DESCRIPTION

Figure 1:
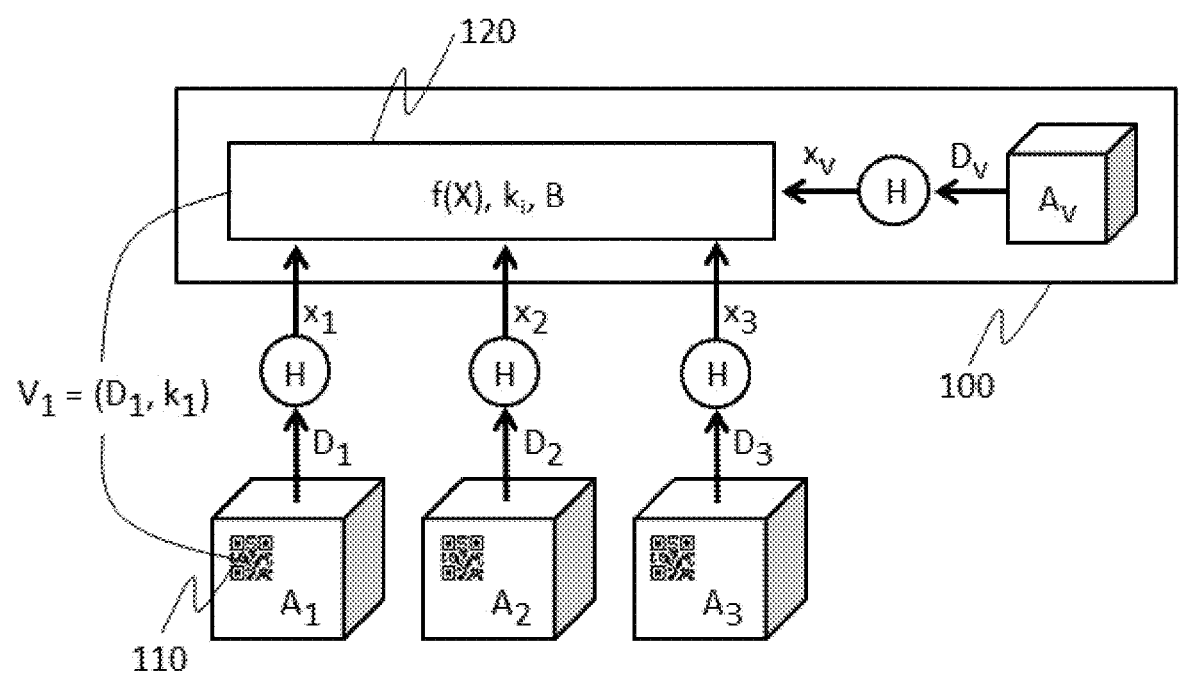
FIG. 1 is a schematic view of a general concept of securing a batch of articles according to the invention.

The present disclosure is here described in detail with reference to non-limiting embodiments illustrated in the drawings.

FIG. 1 illustrates a general concept of the invention relating to securing a batch of articles and a method of computing an encoding of verifying information that may be associated with each article. FIG. 1 illustrates a group or "batch" of articles $A_1, A_2, A_3, \ldots$ which may be anything capable of bearing or containing a physical machine readable security marking 110 (here illustrated by a 2D barcode) or of bearing something that in turn bears or contains the physical security marking. An article could be a manufactured item or its packaging, a physical document or image, a package containing several items (such as a blister pack of medicine), or a container containing pallets of cartons of goods etc. Even a person or animal could be an "article" in the sense of the embodiments of the invention; for example, authorized attendees at an event or members of a group, or members of a flock or herd, could carry some form of ID badge or (especially in the case of animals) be physically marked.

A batch might, for example, be a common manufacturing run, items delivered by a particular supplier, items made or shipped during a time period, a set of related images, a group of people, a flock or herd, or any other user-defined grouping of any objects for which data $A_i$ can be defined. FIG. 1 also shows a "virtual article" $A_v$, which is an optional software construct that may be included to enable encoding of selected data. This is explained further below. By way of example only, virtual article $A_v$ will be assumed to be included, and will be treated below, as other articles $A_1, A_2, A_3, \ldots$, since it may be processed substantially in the same way (although it does not correspond to a real object). Of course, a plurality of virtual articles $A_{v1}, A_{v2}, \ldots, A_{vk}$ can be used for encoding digital data and produce more robust article digital signatures (see below).

For each article $A_1, A_2, A_3, \ldots A_v$, respective digital article data $D_1, D_2, D_3, \ldots, D_v$ is associated or extracted (or, in the case of virtual article $A_v$, created) using any appropriate method. This data might be some measure of physical characteristics, textual data such as completed form or product information, a serial number or other identifier, indications of content, a digital representation of an image, or any other information that the system designer chooses to associate with an article. The article digital data $D_i$ may be extracted from human readable data (e.g. alphanumeric data) marked on an article (e.g. printed on the article or on a label affixed on the article) by means of a reader capable to produce a corresponding digital data file. Further digital data (e.g. instruction for use of the article or safety instructions etc.) can be associated with the extracted data to constitute the article digital data $D_i$.

For the virtual article $A_v$, the associated digital data may include, for example, a batch identification number, the number of articles in the batch, a (pseudo-) random number for the sake of increasing security by increasing data entropy, date and/or time information, etc. One other form of associated data might be indications of allowable or non-permissible operations rules, expiration dates, etc. In short, the digital data $D_v$ may be anything that can be represented in digital form.

For each article, its respective digital article data $D_1, D_2, D_3, \ldots, D_v$ is preferably transformed mathematically in such a way that it is essentially concealed, although this is not an absolute requirement for any embodiment. This transformation applied to the article digital data $D_i$ of an article $A_i$ serves to create a corresponding digital signature $x_i$. This digital signature is produced by means of a one-way function (i.e. a function easy to compute but hard to invert, see S. Goldwasser and M. Bellare "Lecture Notes on Cryptography", MIT, July 2008, http://www-cse.ucsd.edu/users/mihir).

One such advantageous transformation is, for example, applying a hash function $H(\ )=\text{hash}(\ )$ to the article digital data, which generally has the property that it returns an output of a known bit length regardless of the size of the input: this technical effect is particularly useful for creating a digital signature of digital data associated to an article, regardless of the size of the associated article digital data and that of the batch. The Hash function is a well-known example of a one-way function. If a cryptographic hash function such as the SHA (Secure Hash Algorithm) class of functions, for example, SHA-256, is used, then there are the additional benefits that the function is practically irreversible and collision resistant, that is, the probability is negligible that two different inputs will lead to the same output. As will be understood from the description below, this is also not a requirement of the invention, although it is advantageous for the same reasons as in other applications. As shown in FIG. 1, the values $x_1, x_2, x_3, \ldots, x_v$ are the hash values, i.e. the associated article digital signatures, of the respective article datasets, that is, $x_j=H(D_j)$, for $j=1, \ldots, v$. Just for the sake of succinctness, X (capital) is used here and in FIG. 1 to indicate the set of hashed data values; thus $X=(x_1, x_2, \ldots, x_v)$ (if virtual article $A_v$ is included; otherwise, the element $x_v$ may be omitted).

In order to shorten the signature, the article digital signature $x_j$ of article $A_j$ may even be just a sequence of a given plurality of bits of lower weights selected from the bits of the hash value $H(D_j)$: for example, with the SHA-256 hash function of the SHA-2 family, it suffices to retain only the 128 bits of lower weights from the 256 bits of the signature to still have a robust signature with respect to codebreaking attack.

An aggregated digital signature, or batch value, B is then computed over X by means of a (quasi-commutative) one-way accumulator (see the article of Josh Benaloh and Michael de Mare "One-Way Accumulators: A Decentralized Alternative to Digital Signatures", Advances in Cryptology—Eurocrypt' 93, LNCS, vol. 765, pp. 274-285, Springer-Verlag, 1993 and the article "one way function—Disadvantages of one-way accumulators?—Cryptography Stack Exchange" of an anonymous author, Apr. 12, 2014). In general, for a set of $\square$ signatures $x_1, x_2, \ldots x_\mu$ (possibly including digital signatures of one or more virtual articles), the corresponding accumulated value $f(x_1, x_2, \ldots x_\mu)$, abbreviated as $f(X)$ with $X=(x_1, x_2, \ldots x_\mu)$, given by a one-way accumulator f is:

$$f(x_1, x_2, \ldots x_\mu) = f(f(f(\ldots f(f(f(x_1),x_2) \ldots x_3), \ldots ,x_{\mu-2}),x_{\mu-1}),x_\mu).$$

In general, it is possible to write $f(x_1, x_2)=x_1 \otimes x_2$, where $\otimes$ is an associated operator preferably chosen such that $f(X)$ is sufficiently difficult to invert that the computational burden is too high in practical implementations. This concept of computational impracticality as used in embodiments is explained further below. According to the invention, a one-way accumulator is chosen for calculating aggregated signatures in view of the constraint of limiting the size of B. Indeed, such accumulator produces a digital value of which size (i.e. number of bits) does not depend on the size of its arguments.

As a trivial example, the batch value may be a function $f(X)$ such as the commutative addition modulo a given modulus m, i.e. $f(x)=x \mod m$ and $f(x, y)=x \otimes y$, with the associated commutative operator $\otimes$ defined by $x \otimes y=(x+y) \mod m$. Thus, here we have:

$$f(x,y)=f(x)+f(y) (\text{i.e. } f(x,y)=f(x) \otimes f(y)).$$

This one-way accumulator has the following commutativity property (although only quasi-commutativity is necessary for the invention):

$$B = f(X) = x_1 \otimes x_2 \otimes x_3 \otimes \ldots \otimes x_\mu = x_1 \otimes (x_2 \otimes x_3 \otimes \ldots \otimes x_\mu) = x_2 \otimes (x_1 \otimes x_3 \otimes \ldots \otimes x_\mu), \text{etc.} \ldots$$

Now let $X^i$ be the set of all elements of X except $x_i$. For example, with i=1, $X^1 = (x_2, x_3, \ldots x_\mu)$. Assuming for simplicity that f(X) is commutative with respect to the elements of X, and given the property of f(X) above, this leads to the following:

$$B = f(X) = x_1 \otimes f(X^1) = f(X^1) \otimes x_1 = (x_2 \otimes x_3 \otimes \ldots \otimes x_\mu) \otimes x_1 = k_1 \otimes x_1$$

with the verification key $k_1 = (x_2 \otimes x_3 \otimes \ldots \otimes x_\mu) = f(X^1)$.

According to the invention, the aggregated digital signature B of the batch of articles is made immutable, and thus forgery-proof, by being published in a (public) media accessible to a user having to check the authenticity of an article (or its associated data), or stored in a searchable aggregated signature database accessible to the user, or, in a preferred mode, stored in a blockchain accessible to the user. The user may then store the value B acquired from these available sources.

For each article $A_i$, a corresponding article verification key $k_i$ is then computed by means of a partial one-way accumulator of the other article digital signatures $x_j$ (with $j \neq i$), i.e. the one-way accumulator of the digital signatures $x_1, \ldots x_{i-1}, x_{i+1} \ldots x_\mu$ or $f(X^i)$. For example, in the module 120 of FIG. 1, the article verification key $k_i$ of article $A_i$ is calculated as $k_i = f(X^i)$, and the operation of checking that the article digital data $D_i$ and the verification key $k_i$ of article $A_i$ indeed correspond to article data of a genuine article belonging to the batch having the batch value B only necessitates verifying that $k_i \otimes f(H(D_i)) = B$, i.e. $k_i \otimes x_i = B$. The obtained compact (due to the accumulator property) verification key $k_i$, as part of verification information $V_i = (D_i, k_i)$ necessary for calculating B, is included in the security marking 110 applied on article $A_i$ together with the article digital data $D_i$ of $A_i$. This is an important aspect of the invention as space available for data on a security marking is generally limited, particularly to perform offline checking of the authenticity of a secured article, and offline checking of conformity of its associated data with respect to that of a genuine article. The one-way accumulator type for f is precisely chosen in view of the technical problem of reducing the size of the verification key data to be included in a security marking. Indeed, the property of quasi-commutativity (or even commutativity) of such accumulators allows signing data of a given article belonging to a batch of articles without having to further include data relating to an ordering of the articles in the batch or a rank of said given article according to the ordering in the batch. Moreover, the verification operations would be much more computer intensive without said quasi-commutativity property.

A computation module 120 is preferably included within a securing system 100 to execute the code provided for performing the computations for f(X), for the key values $k_i$ for the different articles, and for the common B value. The securing system 100 may also include suitable modules for inputting (pre-programmed) values corresponding to the digital data $D_V$ of the virtual article $A_V$. Hashing of article digital data $D_i$ of article $A_i$ to yield the corresponding article digital signature $x_i$ may also be performed, for example, in the computation module 120. It would also be possible to perform the article-related hashing computations externally (e.g. on a connected distant server), for example, wherever the articles are made, so as to avoid having to transmit raw article data $D_i$ over a network from that site (or sites) to the securing system 100, if that is a concern.

For each article $A_i$, corresponding verification information $V_i$ is compiled and is encoded in some form of machine readable security marking 110 that is then applied physically to or otherwise associated with the respective article. For example, $V_i$ could be encoded on an optically or magnetically readable label, RFID tag, etc., that is attached to the article, or is printed directly on the article or its packaging. As another option, the marking could be on the inside of the article or its packaging if appropriate, either using direct application or, for example, being included on some form of documentation that is inside the packaging.

For any "virtual" article $A_V$, its corresponding verification information $V_V$ may be associated internally with it by the securing system 100. The verification information generally at least includes, for any article $A_i$ of a batch of articles, the corresponding article digital data $D_i$ and the corresponding verification key $k_i$: $V_i = (D_i, k_i)$. According to the invention, the encoding of data $D_i$ and that of data $k_i$ may differ (which provides an additional level of strength with respect to codebreaking attacks).

Additional article data may further be associated with an article and may include, for example, the batch value B or any other information the system designer chooses to include, such as an item serial number, batch ID, date/time information, product name, a URL that points to other, online information associated with either the individual item (such as an image of the article, or of its labelling or packaging, etc.), or the batch, or the supplier/manufacturer, a telephone number one may call for verification, etc. The additional article data may be stored in a searchable information database accessible to a user (via an information database interface).

Once the verification $k_i$ of an original article $A_i$ has been calculated, and included (i.e. via encoding or any chosen data representation), together with the corresponding article digital data $D_i$, in the machine readable article security marking 110 applied on the article, the resulting marked original article and its associated article data is in fact secured against forgery and tampering. An advantage of the invention is that no encoding/decoding key is included in the security marking.

There are different types of physical (security) markings that could be used to encode the verification key and the article digital data (or any other data). Many marking systems that are practical for use on small items, however, or on services that are not able to receive physical markings with high resolution, cannot encode a large amount of data. One way to solve this problem would be to include multiple markings, each including one or more of the elements of the verification vector. In many cases, this is impractical because of lack of physical space or unsuitability of the mark surface, or simply because it would be aesthetically unacceptable.

There are many known methods for encoding information in a way that it can be applied to physical surfaces. Any such method may be used in implementations of any embodiment of this invention. One common form of physical marking is a well-known QR code. As is well known, for a given area, the more data a QR code is able to encode, the higher the module density (roughly, density of black/white "squares") it has and the greater resolution it requires to print and read. In addition to its density (in number of modules squared), QR codes are also generally classified depending on what level of error correction they include. At present, the four different standard "levels", L, M, Q, and H, each representing the degree of "damage", that is, data loss, the QR code image can sustain and recover from. The levels L, M, Q, and H can sustain roughly 7%, 15%, 25% and 30% damage, respectively. The following table shows at least approximate values for different QR code versions:

| Version | Size (in modules) | Number of encodable bits | |
|---|---|---|---|
| | | ECC level L | ECC level H |
| 10 | 57 × 57 | 2192 | 976 |
| 25 | 117 × 117 | 10208 | 4304 |
| 40 | 177 × 177 | 23648 | 10208 |

Not all of the bits may be used to encode a data "load", however, since some modules are used for scan targets, a mask pattern, and the error-correction modules. There is thus a trade-off between the amount of information that a QR code (or whatever marking 110 is used) can encode, and how much information is included in a verification information V and must be encoded.

For a chosen type of security marking 110 (such as a QR code), with a limited encoding capacity, a suitable encoding function f(X) should therefore also be chosen: a function of which output is too large in terms of required bits may be impossible to use at all, and a function of which range is too small may not be secure enough. Moreover, in many applications, scalability may be an issue. For example, some data security schemes involve signatures that grow as the number of members of a batch increases, and that could impermissibly limit the size of a batch from the perspective of how many bits the security marking 110 can encode. This is why, according to the invention, the type of function chosen is the one-way accumulator.

In one illustrative embodiment, the one-way accumulator function f(X) is chosen to be a mere (commutative) modular multiplication, that is f(x)=x mod m, and f(x, =x⊗y=x*y mod m.

Thus, here we have f(x, =f(x)*f(y) and:

$$f(X) = \prod_{i=1}^{\mu} x_i \bmod m = \left(\prod_{i=1}^{\mu} x_i\right) \bmod m$$

i.e. f(X)=$x_1 \otimes x_2 \otimes \ldots \otimes x_\mu$, where m is the modulus and X corresponds to the μ article digital signatures of the □ articles in the batch X=($x_1, \ldots, x_\mu$). The modular multiplication is a very simple example of one-way accumulator (not only quasi-commutative but also commutative), although not robust. Thus, in words, the batch value B=f(X) is computed by multiplying all the article hash values $x_i$ together, and then taking the remainder of this product after division by the modulus m. In some cases, this might lead to an impractically large product. For example, assume that there are 1000 articles in a batch, and each hash value xi is 256 bits long (as obtained with a SHA-256 hash function). To do 999 multiplications and store the result, and then have to do the division by m to get the remainder, would be possible, but clumsy, and require unnecessary computational effort in the form of storing values without truncation. Instead, the system may make use of the property of modulo operations that the result may be computed iteratively, pairwise, as illustrated in the following pseudocode:

B=1
For j=1 to □
B:=[B*x(j)] mod m
Next j

The value B may thus be computed without ever having to multiply more than two hash values before determining the product modulo m.

Of course, any other method may be used to compute f(X) using the product-modulo-m method shown above. A similar algorithm may be used to compute the verification keys $k_i$—to compute key $k_i$, simply skip the step in which j=i.

There are several advantages of using the product-modulo-m method for determining the batch value B and the verification keys. One advantage is that the bit length will not be greater than m, which may be chosen by the user. Moreover, the computations require no floating-point operations and thus there will be no errors due to truncation note that a change of a single bit in an article digital signature will produce a totally different batch value.

The choice of the integer modulus m also reflects a trade-off between security and size, both of the number of bits that the security marking 110 can encode, and of the number of articles in a batch. To illustrates, assume a highly simplified example of batch that includes only three articles, having digital signature hash values $x_1, x_2, x_3$. Now assume that m>max($x_1, x_2, x_3$), then:
$x_1$ mod m=$x_1$,
$x_2$ mod m=$x_2$, and
$x_3$ mod m=$x_3$ In other words, with this choice of m, there is no security for single values of H. On the other hand, unless m is chosen to be m>>max($x_1, x_2, x_3$), then it is unlikely that the product of any two of the hash values modulo m will stay the same value, and it is even less likely that the product of all three will. The more articles and thus hash values in a batch, the more the total product will "wrap around" the modulus m (have a non-zero divisor) and the more difficult it will be to use a "brute force" attack to find a "fake" multiplicand (article hash value) that, multiplied by a known key value, will yield the same batch value, modulo m. As a very simple example, assume that $x_1, x_2, x_3$ and m are 3, 6, 8 and 10.
3 mod 10=3,
6 mod 10=6, and
8 mod 10=8
but
B=3×6×8 mod 10=144 mod 10=4

If the verification key for the first article is given as 6×8 mod 10=8, and the batch value B=4, in order to guess the article hash value 3, one would still need to guess over a set of ten possibilities. The complexity will of course grow as the bit lengths of $x_i$ and m grow. Especially for batches of more than ten articles, or more than 100 articles, with m set to be m>$max_i(x_i)$, for example, to the maximum value that can be represented for a given bit length (such as 256 for an implementation that uses a SHA-256 hash function), it will be computationally inefficient for a malicious actor to try to fake the hash value for each signature of a batch of articles, especially in implementations in which the financial value of each article in the batch is too low to justify attempting such an attack. In other words, using this embodiment, it is simply not worth the effort to try to fake the information encoded in the marking.

The choice m>max($x_1, x_2, \ldots x_\mu$) has the advantage that there is an equivalence property for all the hash values ($x_i$ mod m=$x_i$), but this is not necessary. Rather, any value may be chosen, in particular, to provide a desired bit length for B. It is also not necessary for m to be constant across all implementations of the invention, or even for all batches. As one example, an administrator, manufacturer, etc., could choose a different modulus m for different batches. These could be stored in a database either in the securing system 100, or elsewhere, or be delivered via some other channel to a user, such as a recipient of the articles, to enable only that recipient to easily verify articles from their security marking 110. To avoid having to maintain modulus values in a database, it would also be possible to compute m itself per-batch, for example, as a function of the hash values $x_i$. As just one example, m could be chosen as m=[max($x_1$, $x_2$, ... $x_\mu$)]+1. The module 120 could then determine the modulus m before performing the other calculations such as f(X), $k_i$ and B. The module 120 could also input a user-selected encoding size (such as a QR code version) and determine an appropriate modulus (and thus a bit size) to ensure that the encoded data ($D_i, k_i$) in the security marking will fit, i.e. the data necessary to retrieve $x_i$=H($D_i$) and calculate the batch value B from:

$$f(x_i \otimes X^i) = x_i \otimes f(X^i) = f(X^i) \otimes x_i = k_i \otimes x_i.$$

A user, recipient of an article such as $A_1$ for example, may then scan (or otherwise read) with an imager the security marking on $A_1$ and extract the article digital data $D_1$ and the verification key $k_1$, (and any other information that may have been encoded into the marking). For the sake of verification of the marked article $A_1$, the user must first retrieve the verification information $D_1$=($D_1$, $k_1$) from the security marking on $A_1$ and thus, calculate the digital signature $x_1$ from the extracted article digital data $D_1$: to do that the user must know the one-way function to be used for calculating an article digital signature, here the hash function H( ), and then perform the operation $x_1$=H($D_1$) to obtain the full data ($x_1$, $k_1$) necessary to calculate a corresponding candidate aggregated digital signature $B^c$. The user may for example receive the one-way function securely (for example, using a public/private key pair) or by requesting this from the article provider or whichever entity having created the signatures and keys, or having it already programmed in a user's processing unit of its imager.

Next, in order to calculate such candidate aggregated digital signature $B^c$, the user will need to further know the type of one-way accumulator f( ) to be used for that, here the user needs to know the modulus m of the modular multiplication (or similar information if some other function f was used). Assuming that a "standard" modulus is not used, for example, for all articles from the supplier, the user may then receive the modulus in any known manner, either securely (for example, using a public/private key pair) or simply by requesting this from the article provider or whichever entity created the verification data, or having it already programmed in the user's processing unit.

With the modulus m, the user may then compute a candidate aggregated digital signature $B^c = k_1 \otimes x_1$, which should then be equal to the available (or published) B value: this value may have been previously acquired by the user and/or already stored in a memory of the imager's processing unit, it could also be a value that the recipient requests and receives from the system administrator in any known manner. If the candidate $B^c$ and the available aggregated digital signatures B match, this computation then verifies the information in the secure marking 110 and confirms that the article $A_1$ is from the correct batch. The secure marking should preferably be made and/or applied to the article in any difficult-to-copy and/or difficult-to-remove (tamper-proof) manner. In this case, a matching of the aggregated digital signatures can then indicate to the user that the article is likely authentic. This is particularly interesting because authentication of article $A_1$ does not necessitate its material authentication, i.e. via an intrinsic physical characteristic of $A_1$ or by means of a material-based security marking applied on $A_1$.

A link to access the batch value B for the batch corresponding to the article $A_1$ could be included in the security marking 110 (for example, a web address, if B can be retrieved on a corresponding web site), although it is not a preferred variant.

In some implementations, recipients of an article $A_i$ may be capable of "visually" extracting the article data corresponding to the digital article data $D_i$ directly from the article. For example, the article data might be textual, such as a serial number, or text in a descriptive writing, or some alphanumerical encoding elsewhere on the article or its packaging and human readable from the articles themselves or something attached to or included in them. Recipients of articles could also be provided with appropriate software, such as a module in an imager device such as a smart phone that either inputs data, or reads data optically via the phone camera, and which then computes $x_i$=H($D_i$) for the article at hand. For example, with a security marking 110 on article $A_1$ being a standard QR code, a user could easily obtain by scanning the QR code with an imager, using a standard QR code reader application running on the imager, the digital data $D_1$ and $k_1$, a verification application in the user's imager could then compute $x_1$=H($D_1$) and $B^c$=f(X)= $f(x_1 \otimes X^1) = x_1 \otimes f(X^1) = f(X^1) \otimes x_1 = k_1 \otimes x_1$, and compare this value with the available batch value B, as explained above. For example, if the operator $\otimes$ corresponds to the modular multiplication, then $k_1 \otimes x_1 = (k_1 * x_1)$ mod m.

Preferably, the aggregated digital signature (i.e. batch value) B is stored in a searchable aggregated signature database that can be accessed (via a communication link) by the user by means of its imager equipped with a communication unit, as this is the case with the above example of a smart phone. The user having to verify the article $A_1$ can just send a request with its smart phone to the address of the database, via a signature acquisition interface of the database, the request containing the article data $D_1$ read on the security marking 110 on $A_1$ (or the calculated digital signature $x_1$=H($D_1$)) allowing to retrieve the corresponding batch value B, and the acquisition interface will return the aggregated digital signature B to the smart phone. The database may be secured by a blockchain in order to strengthen the immutability of the stored aggregated signatures. An advantage of the invention is to make the link between a physical object, i.e. an original article, and its attributes, i.e. the associated article data and its belonging to a batch of articles, practically immutable through the corresponding aggregated digital signature.

The above mentioned verification process of an article $A_i$ may also serve to authenticate human readable article data further marked on $A_i$ on a corresponding article data marking applied on $A_i$, or printed on a packaging of $A_i$, or on a leaflet. Indeed, a user can read on a display of the imager the corresponding article digital data $D_i$ as read on the security marking on the article $A_i$ and decoded by the imager, and visually check that the displayed information is consistent with the article data on the article data marking.

In a preferred embodiment, the article data, or its corresponding article digital data $D_i$, further include unique physical signature data of a unique physical characteristic of the marked original article $A_i$ that can be used for (materially) authenticating $A_i$. Thus, with the digital data corresponding to the unique physical characteristic of an article $A_i$ being $UPC_i$, the corresponding unique physical signature data $UPS_i$ can be obtained by encoding of $UPC_i$ (preferably by means of a one-way function): for example, by taking a hash of the digital data $UPC_i$, i.e. $UPS_i = H(UPC_i)$. However, any other known encoding could be used instead: for example, in order to have a short signature, it is possible to use an elliptic curve digital signature algorithm. As an illustrative very simplified example of digital data $UPC_i$ corresponding to a unique physical characteristic of an article $A_i$, we consider a mere digital image obtained by imaging the article $A_i$ (or a specific zone on $A_i$), the corresponding unique physical signature data $UPS_i$ being, for example, a hash of the digital image, $UPS_i = H(UPC_i)$. The digital data $UPC_i$ having generated the signature $UPS_i$ is the reference physical characteristic digital data for $A_i$ and the obtained signature $UPS_i$ is the corresponding reference physical signature data for $A_i$. Preferably, $UPS_i$, i.e. the reference physical signature data for article $A_i$, is stored in a searchable database or in a blockchain (or in a database secured by a blockchain) accessible to the users (for example, via a request containing the article digital data $D_i$ read on the security marking of $A_i$, or its corresponding digital signature $x_i$). Thus, the stored $UPS_i$ acquires an immutable character. A copy of $UPC_i$ may be further stored in the memory of the user's imager. In a variant of the embodiment, a copy of $UPS_i$ may also be further stored in the memory of the user's imager (to allow offline checking operation).

A check of authenticity of an article $A_i$ may be performed by extracting candidate unique physical characteristic digital data $UPC_i^c$ from the digital data $D_i$ read (here, with a decoding application running on the imager, which may be a smartphone for example)) on the security marking on article $A_i$, and comparing it with the reference unique physical characteristic digital data $UPC_i$ stored in the memory of the imager: in case of matching $UPC_i^c = UPC$ the article $A_i$ is considered as genuine (its digital content corresponds to that of a genuine marked original article). If the reference unique physical characteristic digital data $UPC_i$ is not stored in the memory of the imager, but instead the reference unique physical signature data $UPS_i$ is stored in the memory of the imager (with the advantage of taking up much less memory compared with $UPC_i$), then the authenticity of $A_i$ can still be checked by verifying that the candidate unique physical signature data $UPS_i^c$ obtained by calculating the hash value of the candidate unique physical characteristic digital data $UPC_i^c$ extracted from the digital data $D_i$, i.e. $UPS_i^c = H(UPC_i^c)$, matches the reference unique physical signature data $UPS_i$ stored in the memory.

A user may further check the authenticity of a received article A still via offline (self-verifying) process, by detecting said unique physical characteristic on A by means of a sensor capable to perform such measurement (here, the imaging unit of the imager), and obtaining a candidate unique physical characteristic digital data $UPC_i^c$ from the detected characteristic (here, a digital image taken by the imager). Then, the user can compare (via the image processing unit of its imager, or visually on a display of the imager) the obtained $UPC_i^c$ with a copy of the reference $UPC_i$ (stored in the memory of the imager): in case of "reasonable" matching $UPC_i^c \approx UPC_i$ (i.e. the two digital data agree within some given tolerance or similarity criterion), the article $A_i$ is considered as genuine.

Moreover, the user may also further calculate the corresponding candidate physical signature data from the copy of the reference $UPC_i$ stored in the memory of the imager as $UPS_i^c = H(UPC_i)$, and compare it with the reference physical signature data $UPS_i$ stored in the memory of the imager: in case of matching $UPS_i^c = UPS_i$, the article $A_i$ is confirmed as being genuine with an even higher degree of confidence. Moreover, in case of matching, the article digital data $D_i$ associated with $A_i$, which has been verified as corresponding to that of a genuine article, as explained above by retrieving the corresponding batch value B from the read verification information $(D_i, k_i)$ on the security marking on $A_i$, is also authenticated. In a preferred mode, the copy of the reference physical characteristic digital data $UPC_i$, instead of being stored in the memory of the user's imager, is part of the article digital data $D_i$ included in the security marking on article $A_i$ and can be obtained by reading it on the security marking (with the imager). However, in a variant (still compatible with offline verification), the copy of the reference physical characteristic digital data $UPC_i$ may instead be included in the article data marking applied on article $A_i$ (and readable by the user's imager).

In a variant of the embodiment, the checking of authenticity of an article $A_i$ by a user may be performed via online process: in this case, the reference data UPCi and/or UPSi are stored in a searchable database accessible to the user wherein the reference data relating to an article $A_i$ is stored in association with, respectively, the corresponding article digital data $D_i$ (included in the security marking on $A_i$) or with the corresponding article digital signature $x_i$ (that can be calculated by the user once the data $D_i$ is extracted from the security marking via the operation $x_i = H(D_i)$ and can be requested by sending to the database a query containing, respectively, $D_i$ or $x_i$.

Of course, any other known intrinsic physical/chemical property can be used to obtain the digital unique physical characteristic $UPC_i$ of an article $A_i$, and the corresponding unique physical signature data $UPS_i$. As another illustrative example, it is possible to print the 2D barcode forming the security marking 110 on an original article with a security ink including a luminescent pigment having its characteristic decay time constant as well as its light excitation wavelength window and its luminescence emission wavelength window: the result is an ink having a specific reference decay time value τ that serves as a material "fingerprint" of the ink. It suffices to illuminate the security marking 110 with excitation light in an illumination wavelength window covering the pigment excitation wavelength window, and collect a resulting luminescence light from the security marking with a sensor capable to detect light intensity within the luminescence emission wavelength window in order to authenticate the security marking. For example, the user's imager may be equipped with a flash capable to deliver the excitation light to the security marking, a photodiode capable to collect the corresponding luminescence light intensity profile I(t) (over a detection time interval) from the security marking, and the imager's CPU being programmed to calculate a decay time value from the collected intensity profile I(t). For example, the excitation wavelength window may be within the UV (ultra violet) band and the emission wavelength window within the IR (infra red) band. If, during verification of the article, the luminescence light intensity collected by the user's imager shows a characteristic decay over time corresponding to a candidate decay time $τ_c$, then the ink, and consequently the security marking, is considered as genuine if $τ_c \approx τ$ (within a given range of tolerance). In this case, the digital data $UPC_i$ of a marked article $A_i$ includes at least the reference decay time value τ (and possibly data relating to the excitation wavelength window and the emission wavelength window). As it is clear from the above examples, including reference unique physical characteristic digital data in the verification information of a security marking has the technical effect of providing a forgery-proof link between the digital data of an article and the authentication data of this very article.

Instead of the product modulo m of the above illustrative example, any other known (commutative or quasi-commutative) one-way accumulator may be used (with its corresponding operator ⊗). For example, the quasi-commutative one-way accumulator defined by $f(x) \equiv f(I; x) = I^x$ mod m (i.e. exponentiation modulo m), or by the equivalent symbolic operator notation I⊗x, where I is a given number (integer) and m is the given modulus. Thus, $f(x, y) \equiv f(I; x, y) = f(f(I; x), y) = f(I; x) \otimes y = (I^x \mod m)^y \mod m = I^{x*y} \mod m = I \otimes x*y$. The aggregated digital signature B for a batch of µ articles $A_1$, $A_2 \ldots A_\mu$ (that may include virtual articles) of which respective article digital data are $D_1, D_2 \ldots D_\mu$, with corresponding associated article digital signatures $x_1$, $x_2 \ldots x_\mu$, is calculated for $X=(x_1, x_2 \ldots x_\mu)$, as $B=f(I; X)$, i.e.:

$$B = f(f(f(\ldots f(f(f(I,x_1),x_2),x_3),\ldots,x_{\mu-2}),x_{\mu-1}),x_\mu),$$

which can be reduced, based on the quasi-commutativity of f, to:

$$B = f(X) \equiv f(I;X) = (I^{\Pi x_i}) \mod m = I \otimes \Pi x_i,$$

where $\Pi x_i$ designates the product from i=1 to i=□ of the article digital signatures components $x_1, x_2, \ldots x_\mu$ of X, i.e. $\Pi x_i = x_1 * x_2 * \ldots * x_\mu$. Indeed, the quasi-commutativity of this one-way accumulator allows writing (for all I and all x, y): f(f(I;x),y)=f(f(I;y),x), with the above mentioned resulting advantage that the verification step does not necessitate having additional ordering information of the signatures $x_i$.

The article digital signatures $x_i$ are calculated, as explained above, by means of any known one-way function. Preferably, the digital signature $x_i$ is obtained by a hash function of the corresponding article digital data $D_i$: $x_i = H(D_i)$ (for above mentioned reasons).

The verification key $k_j$ corresponding to the digital signature $x_j$ of the article digital data $D_j$ of an article $A_j$ from a batch of □ articles is thus calculated as: $k_j = I^{(\Pi x_i / x_j)} \mod m$, with $(\Pi x_i / x_j) = x_1 * x_2 * \ldots * x_{j-1} * x_{j+1} \ldots * x_\mu$, or with the symbolic notation $k_j = I \otimes x_1 * x_2 * \ldots * x_{j-1} * x_{j+1} \ldots * x_\mu$.

With the notation $X^j = (x_1 * x_2 * \ldots * x_{j-1} * x_{j+1} \ldots * x_\mu)$, we have the more compact formula $k_j = f(X^j)$, with $(\Pi x_i / x_j) = x_1 * x_2 * \ldots * x_{j-1} * x_{j+1} \ldots * x_\mu$ being the product of the components of $X^j$.

Consequently, the operation of checking that the article digital data $D_j$ and the verification key $k_j$ from a secure marking of an article $A_j$ indeed correspond to article data of a genuine article belonging to the batch having the batch value B only necessitates calculating the article digital signature $x_j$ as $x_j = H(D_j)$ and then verifying that $x_j$ and $k_j$ allow retrieving the aggregated digital signature B via:

$$k_j^{H(D_j)} \mod m = k_j^{x_j} \mod m = B \text{ (or } k_j \otimes x_j = B\text{)}.$$

Preferably, the (integer) modulus m is chosen to have a size of at least 2048 bits in order to provide good robustness with respect to codebreaking attacks.

The above exponentiation operator (and all its known "variants", like the Naccache operator $f(x) = I^x C^{x-1} \mod m$, for any given numbers I and C, for example) is just another example of one-way accumulator given here for illustrative non-limitative purpose.

Another illustrative embodiment of the invention relates to a batch of biometric identification documents, e.g. biometric passports, as shown on FIG. 2.

In this example we still use a hash function as a one-way function for signing the passport data, preferably a SHA-256 hash function in view of its well-known robustness. Indeed, in view of a given size of the batch, the hash function that is selected (having its known bucket listing) for the purpose of signing the passport data is thus an example of a one-way encryption function such that each distinct passport has its distinct signature, which thus make the signature unique. The domain of a hash function (i.e. the set of possible keys) being larger than its range (i.e. the number of different table indices), it will map several different keys to a same index which could result in collisions: such collisions can be avoided, when the size of the batch is known, by considering the bucket listing associated with the hash table of a hash function and retaining only a function giving zero collisions, or by independently choosing a hash-table collision resolution scheme (for example, such as coalesced hashing, cuckoo hashing, or hopscotch hashing).

Figure 2A:
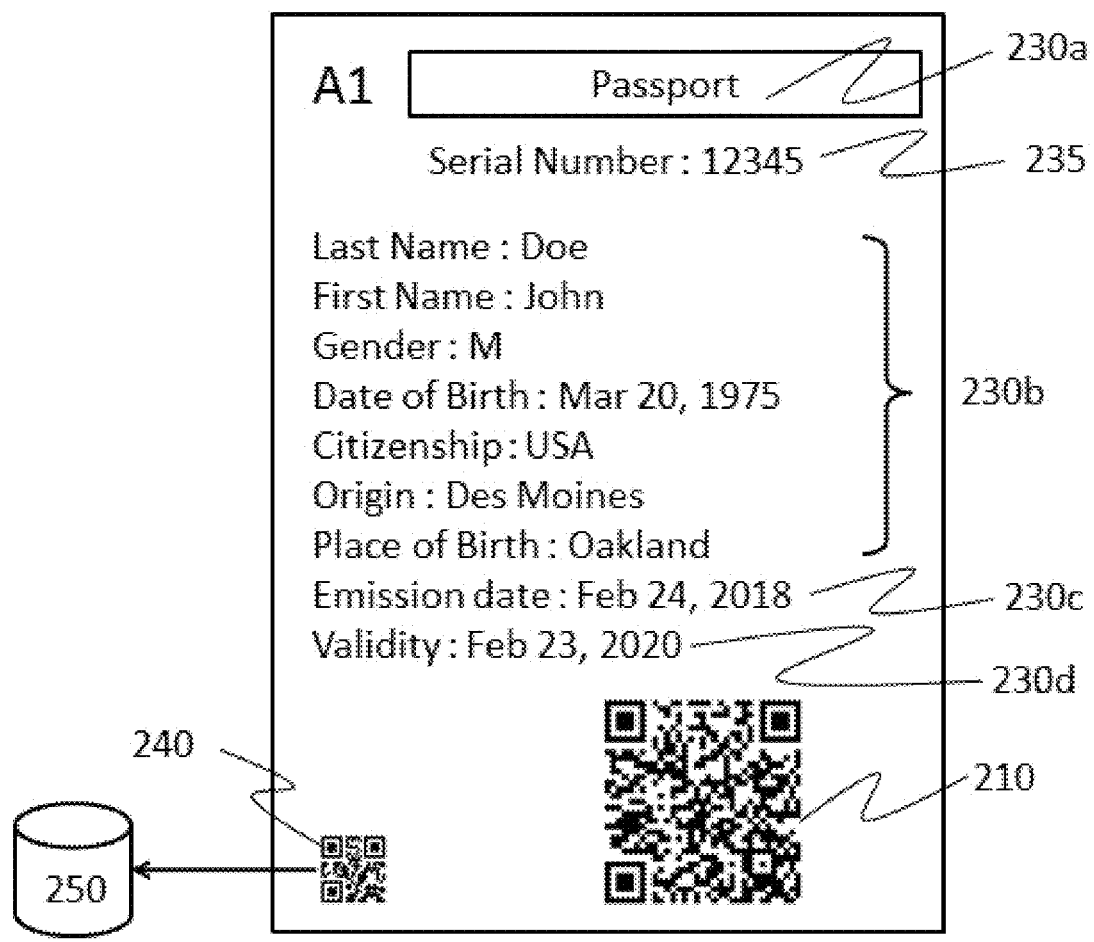
FIG. 2A illustrates a secured biometric passport as an example of biometric identity document secured according to the invention.

FIG. 2A shows an example of biometric passport $A_1$ secured with a machine readable security marking 210 (here a QR code), and comprising a passport data marking 230 containing conventional passport data, i.e. visible printed data such as a title of the document 230a ("Passport"), a set of biography data of the owner of the passport 230b: last name ("Doe"), first name ("John"), gender ("M"), date of birth ("Mar. 20, 1975"), citizenship ("USA"), origin ("Des Moines"), place of birth ("Oakland"), a date of emission of the passport 230c ("Feb. 24, 2018") and a validity period 230d ("Feb. 23, 2020"). These passport data may further comprise some (unique) serial number(s) 235 assigned by the authority delivering the passport (here "12345"). The passport data further comprise biometry data of the owner of the passport as data corresponding to a unique physical characteristic (UPC) of an individual associated with the passport. A machine readable representation 230e (e.g. an alphanumeric one) of data characterizing said unique physical characteristic (not shown), corresponding to said biometry data, is associated with the passport data 230. A representation of digital data is to be understood in a broad sense of the term: this representation of data only needs to enable retrieving the original digital data. The machine readable data representation 230e, i.e. the biometry data, of the unique physical characteristic may correspond, for example, to fingerprint identification data or iris identification data of the owner of the passport. For example, biometry data 230e corresponding to a fingerprint of a person may result from an analysis of a set of specific minutia features of fingerprint ridges like ridge ending, bifurcation and short ridges (according to the conventional Henry System of Classification).

Thus, for a given passport $A_j$ of the batch of µ delivered biometric passports, here with µ=1024, the associated passport digital data $D_j$ includes the digital data corresponding to the above mentioned data 230a-230e. Preferably, additional passport digital data are associated with the above mentioned passport data 230. For example, a digital image of the fingerprint pattern of the owner of the passport, or a digital identity photograph etc. In a variant of the embodiment, these additional passport digital data are stored in a searchable information database 250 that can be searched via an information request containing some passport data (for example, the name of the owner or the biometry data or data from the security marking or the unique serial number 235) to retrieve the corresponding fingerprint pattern data and receive it back. Preferably, a link to the information database 250 is included in an information access marking 240 applied on the passport: here this is a QR code containing a reference index to retrieve corresponding additional data in the information database 250. However, in a variant of passport control operation involving access to a distant information database (online operation), the QR code could contain, for example, the URL of the information database that is accessible via the web.

A digital signature with a one-way hash function of the passport digital data $D_j$ corresponding to the passport data 230a-230e of the passport $A_j$ is then calculated by means, for example, of the above mentioned robust SHA-256 hash function to obtain the corresponding (unique) passport digital signature $x_j=H(D_j)$. In a same way, the passport digital signatures of all the passports in the batch, for all the different owners, are calculated.

From all the signatures of the passports in the batch, an aggregated digital signature B is calculated with a one-way accumulator. For example, in this embodiment, the aggregated signature for the batch is obtained by means of the above mentioned exponentiation modulo m one-way accumulator defined by $f(x)=I^x \bmod m$, where I is a given integer number and m is the modulus. Thus, the aggregated digital signature B for a batch of $\mu$ biometric passports $A_1, A_2 \ldots A_\mu$ (that may include virtual passports) of which respective passport digital data are $D_1, D_2, \ldots D_\mu$, and with corresponding associated passport digital signatures $x_1=H(D_1)$, $x_2=H(D_2), \ldots, x_\mu=H(D_\mu)$, is calculated for $X=(x_1, x_2, \ldots, x_\mu)$, as:

$$B=f(X)=(I^{\Pi x_i}) \bmod m,$$

where $\Pi x_i$ designates the product from i=1 to i=$\mu$ of the passport digital signatures $x_1, x_2, x_\mu$, i.e. $\Pi x_i=x_1 * x_2 * \ldots * x_\mu$, and the size of the modulo m is chosen to be of 2048 bits, for example. As explained above, with the notation $X^j=(x_1, x_2, \ldots * x_{j-1}, x_{j+1}, \ldots, x_\mu)$, the verification key $k_j$ for a passport $A_j$ is calculated as the partial one-way accumulator $k_j=f(X^j)$, and the verification information $(D_j, K_j)$ is included in the security marking 210 applied on the passport $A_j$. The operation of checking that the passport digital data $D_j$ and the verification key $k_j$ of a biometric passport $A_j$ indeed correspond to passport data of a genuine biometric passport belonging to the batch of biometric passports having the batch value B only necessitates calculating the passport digital signature $x_j=H(D_j)$ and verifying that $x_j$ and the verification key $k_j$ allow retrieving the available corresponding batch value B via: $k_j^{x_j} \bmod m=B$ (or $k_j \otimes x_j=B$). Thus, a biometric passport secured according to the invention provides both a forgery-proof link between the "personal data" and the "biometry data" of its holder, and a unique and forgery-proof link between the physical person of the holder and the holder's identity.

Figure 2B:
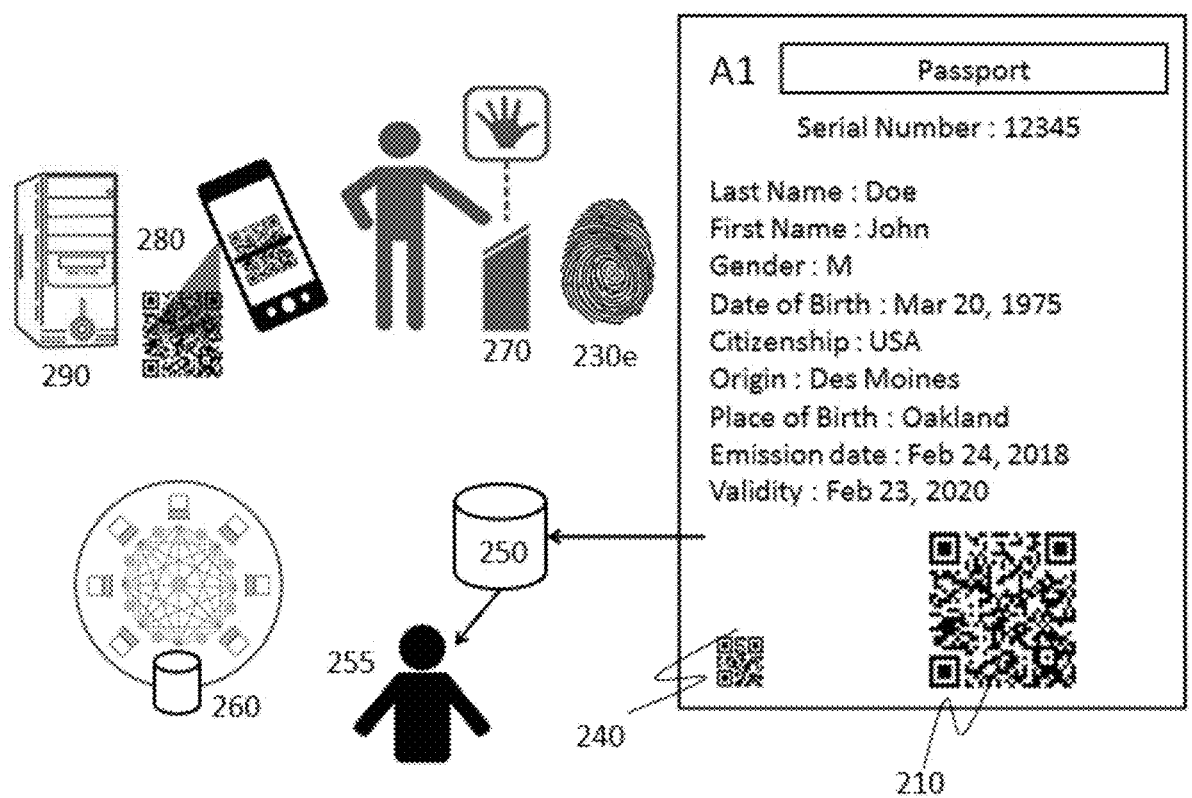
FIG. 2B illustrates a control of an individual having the secured biometric passport of FIG. 2A by an authorized officer.

FIG. 2B illustrates a control process of the secured biometric passport $A_1$ of FIG. 2A, with its passport data marking 230 corresponding to a certain John Doe, with its biometry data 230e corresponding to John Doe's fingerprint, and with additional passport digital data corresponding to a digital identity photograph 255 of John Doe that is accessible via the link to the information database 250 included in the information access marking 240. The passport data further comprises the unique serial number 235 assigned by the authority having delivered the passport. The security marking 210 applied on the passport contains the verification information $(D_1, k_1)$, with passport digital data $D_1$ corresponding to the printed passport data 230a-230d, the biometry data 230e and the unique serial number 235, and the verification key $k_1$ corresponding to $f(X^1)$, with notation $X^1=(x_2, \ldots, x_{1024})$, $x_i=H(D_i)$ i=2, \ldots, 1024 and f being the exponentiation modulo m (with given values of the integers I and m). The batch value B is obtained from all the passport digital signatures $(x_1, \ldots, x_{1024})$ as B=f(X), with $(X=x_1, \ldots, x_{1024})$ The calculated aggregated digital signature B may further be time-stamped and stored in a blockchain 260. In this example, the biometry data 230e of the respective holders of the biometric passports of the batch are also stored in the blockchain 260 in association with, respectively, their corresponding unique serial numbers (so as to make these data immutable). The stored biometry data of John Doe can be retrieved by sending a request to the blockchain 260 indicating the unique serial number 235 mentioned on his passport. The authorities in charge of controlling identity of people (for example, the police, the customs etc.) can access the blockchain 260 via a communication link, and, in this illustrative embodiment, have also local storage capabilities for storing the (published) aggregated digital signatures of all the delivered batches of biometric passports. In the example shown on FIG. 2B, the information database 250 is local (i.e. directly accessible to the authorities, without having to use a public communication network). Moreover, these authorities are equipped with fingerprint scanners 270 to capture the fingerprints of individuals and calculate corresponding machine readable representations of data characterizing the captured fingerprints, i.e. biometry data 230e.

During an identity control of John Doe, say by a police or a customs officer, the officer takes the secured biometric passport $A_1$ of John Doe, reads and decodes the verification information $(D_1, k_1)$ stored in the security marking 210 on the passport by means of an appropriate handheld reader 280 connected to a computer 290 (forming an imager), the computer being connected to the local storage capabilities 250. Having read the passport digital data $D_1$ and the verification key $k_1$ and sent it to the computer 290, a dedicated application (with programmed hash function H and one-way accumulator) running on the computer 290 calculates the passport digital signature $x_1$ (as $x_1=H(D_1)$) and a candidate batch value $B^c$ as $k_1^{x_1} \bmod m=B^c$. Then, the computer can, for example, search in the local information database 250 a batch value B matching the value $B^c$: in case there is no matching, the passport is a forged one and "John Doe" (i.e. the screened individual claiming that his name is John Doe) may be arrested. In case $B^c$ matches some stored batch value B, the passport is considered as genuine and the officer may perform additional security checks:

the officer retrieves the digital identity photograph 255 stored in the information database 250, by sending a request via the computer 290 containing the serial number 235 printed on $A_1$, receives it back and display the received identity photograph 255 on a screen of the computer 290: the officer can then visually compare the displayed visage (i.e. that of a certain John Doe) with that of the individual being checked and estimate if the two visages are similar or not; and the officer retrieves the biometry data 230e on the passport $A_1$ by reading these data on the security marking 210 with the handheld reader 280 connected to the computer 290, and scans the individual's fingerprint by means of a fingerprint scanner 270 connected to the computer 290 and obtains the corresponding individual's biometry data: the officer then checks by means of a program running on the computer 290 if the retrieved biometry data 230e is similar (within a given margin of error) to the obtained individual's biometry data. If the two visages and the biometry data are judged similar, everything is all right and the checked individual is indeed John Doe, the owner of the genuine biometric passport $A_1$. In case of any one of the above additional security checks fails, clearly, the individual in front of the officer is not the true holder of the genuine biometric passport $A_1$ and has probably stolen the passport of a certain John Doe. Thus, with a secured biometric passport according to the invention a mere offline check can quickly detect any fraud.

In fact, it is even possible to reduce a biometric passport document to a mere piece of paper with just a printed 2D barcode (like the above example of a QR code) including the verification information V=(D, k): with V comprising the holder's biography data and (unique) biometry data, like the holder's fingerprint (within the passport digital data D) and the verification key. Indeed, according to the invention, even this "reduced" secured passport takes full advantage of the above mentioned forgery-proof link created between the "personal biography data" and the "biometry data" of the passport holder, and the unique and forgery-proof link between the physical person of the holder and the holder's identity.

Figure 3:
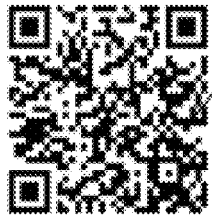
FIG. 3 illustrates a batch of components of an aircraft secured according to the invention.

Another illustrative embodiment of the invention relates to components of an aircraft, as shown on FIG. 3. Due to the very high price of certain critical components from which failure could affect the security of the aircraft, like some parts of the reactors (e.g. turbine blades, pumps . . . ) or of the landing gear, or batteries etc. . . . , counterfeiters are interested to produce copies of these components but of course without complying with the required safety technical requirements due to their generally lower quality. Even if an aircraft component is generally marked with a corresponding unique serial number to identify it, that sort of marking may be easily counterfeited. These counterfeit airplane parts are generally defective and can cause severe damages or even plane crashes. This is a growing security problem today. Moreover, even if the components are genuine, they may not be convenient for certain versions of a same type of aircraft, and there is a serious risk that an inappropriate component is inadvertently used for repairing a given aircraft for example. It is thus important to secure at least the critical genuine components that are allowed for given aircraft.

Generally, each component has a corresponding technical data sheet indicating e.g. the component technical name, the component unique serial number, the component manufacturer name, the manufacturing date of the component and certification information. Moreover, for a given aircraft, a corresponding record contains all the technical data sheets of its respective components. However, counterfeited components may have their corresponding fake technical data sheet and thus, it is not obvious (unless by performing technical tests, for example) to detect fraud. For example, how to be sure that a technical data sheet corresponds well to a component mounted on a specific aircraft (and vice versa)?

According to an illustrative embodiment of the invention, the allowed parts to be used for manufacturing or repairing a given aircraft, or that are mounted on the aircraft, are considered as belonging to a batch of "articles" for that very aircraft.

In the specific illustrative embodiment shown on FIG. 3, each article of an aircraft batch, i.e. each allowed aircraft component for mount or repair on a given aircraft, has a corresponding aircraft component identification document AC-ID that contains the same component digital data as in a conventional technical data sheet (e.g. the aircraft ID code, the aircraft manufacturer name, the component technical name, the component unique serial number, the component manufacturer name, and the manufacturing date of the component) together with additional digital data corresponding, to the aircraft ID code, the aircraft manufacturer name, the assembly date of the component on the aircraft, the name of the technician in charge of performing the conformity check together with the date of the conformity check, and the corresponding (unique) digital signature of the checker. Moreover, each aircraft component identification document AC-ID is secured by means of a machine readable security marking applied on it (preferably tamper-proof). Preferably, each time a component or a set of components are replaced on the aircraft, corresponding secured AC-ID documents are created and a corresponding updated version of the aircraft batch is also created, with the above mentioned corresponding additional digital data (relating to the new mounting operations).

Thus, all the (critical) mounted components on a specific aircraft (here, having the aircraft ID reference HB-SNO), belong to a corresponding batch of mounted components (here, having a total of □ components). A security marking 310 (here in the form of a QR code) is printed on each aircraft component identification document, for example AC-ID: $A_{125}$, that is associated with the corresponding aircraft component, here $A_{125}$, mounted on the aircraft HB-SNO. FIG. 3 particularly shows the component $A_{125}$ of the aircraft batch being a turbine blade adapted to the reactor type mounted on the aircraft HB-SNO and marked with a unique manufacturing serial number (here, 12781, generally engraved by the manufacturer). The component digital data $D_{125}$ (or article digital data) associated with component $A_{125}$ comprises the digital data corresponding to that of the data marking 330 printed on the AC-ID: A125: the aircraft ID code 330a (here, HB-SNO), the aircraft manufacturer name 330b (here, AeroABC), the component technical name 330c (here, turbine blade—$1^{st}$ ring), the component serial number 330d (here, 12781), the component manufacturer name 330e (here, PCX), the manufacturing date of the component 330f (here, Nov. 13, 2017), the assembly date of the component on the reactor 330g (here, Feb. 24, 2018), the name of the technician in charge of performing the conformity check 330h (here, the checker is Martin White) together with the date of the conformity check 330i (here, Mar. 20, 2018), and the (unique) digital signature of the checker 330j (here, 2w9s02u).

A component digital signature $x_{125}$ of the component digital data $D_{125}$ of the AC-ID: $A_{125}$ of component $A_{125}$ is calculated by means of a one-way hash function H as $x_{125}=H(D_{125})$. In the same way, all the component digital signatures $x_i$ of the component digital data $D_i$ of component $A_i$ are calculated by means of the one-way hash function H as $x_i=H(D_i)$ (here, i=1, . . . , □). Let X correspond to the whole set of component digital signatures $X=(x_1, x_2, \ldots, x_\mu)$, and let $X^i$ correspond to the whole set of component digital signatures with the exception of the signature $x_i$, i.e. $X^i=(x_1, x_2, \ldots *x_{i-1}, x_{i+1}, \ldots, x_\mu)$. As already explained, an aggregated digital signature B for the batch of µ aircraft components $A_1, \ldots, A_\mu$ is calculated by means of a one-way accumulator f as $B=f(X)$. The aggregated digital signature is then stored in a searchable database (preferably a blockchain) accessible to technicians in charge of controlling or changing the mounted components.

For a given component $A_i$ of the batch, a corresponding verification key $k_i$ is calculated by means of the corresponding partial one-way accumulator as $k_i=f(X^i)$. For each component $A_i$ mounted on the aircraft HB-SNO, the associated component digital data $D_i$ and the corresponding verification key $k_i$ are embedded in the security marking applied on the corresponding aircraft component identification document AC-ID: $A_i$. For example, in case of a control operation of a component on the aircraft HB-SNO, a technician may send a request to the searchable database containing the component serial number 12781 read on the AC-ID: $A_{125}$ of component $A_{125}$ to be controlled, or its verification key $k_{125}$ as read on the security marking 310 on the corresponding AC-ID: $A_{125}$ document with an appropriate reader, and will receive back the corresponding batch value B. However, in a preferred variant allowing complete offline checking, the technician's reader is connected to a computer having a memory storing all the aggregated digital signatures relating to the aircrafts to be controlled. In this latter variant, the technician can then check if the component is genuine by reading the component digital data $D_{125}$ on the security marking 310, checking that the unique serial number 330*d* (here, 12781) extracted from $D_{125}$ matches the serial number physically marked on the mounted aircraft component $A_{125}$, calculating the corresponding component digital signature $x_{125}$ (for example, by running a programmed application on a CPU of the computer which calculates the signature $x_{125}=H(D_{125})$ from the read digital data $D_{125}$), calculating a candidate batch value $B^c$ via the one-way accumulator function programmed on the computer's CPU as $B^c=k_{125}\otimes x_{125}$ (the operator $\otimes$ corresponding to the one-way accumulator f), and checking that the candidate batch value $B^c$ matches one of the batch values stored in the computer's memory (i.e. B, corresponding to the aircraft HB-SNO). In case of full matching (i.e. the serial numbers match and $B^c=B$), the component $A_{125}$ is considered as genuine and belongs to the (up-to-date) aircraft batch of allowed components of the HB-SNO aircraft, if $B^c$ does not match a stored batch value B, or if the serial numbers do not match, the component $A_{125}$ is possibly counterfeit, or is a genuine component not allowed for the aircraft HB-SNO (e.g. $A_{125}$ does not belong to the right batch for this aircraft), and must be changed.

In a same way, the invention would allow detecting fraud (or errors) from batches of secured AC-IDs of replacement parts stored in a warehouse by verifying the authenticity of the secure markings on the stored parts and checking that the component serial number from the security marking matches that marked on the corresponding component. In case of a highly critical component, a tamperproof material-based security marking may further be applied on the component, while the digital data relating to the corresponding reference unique physical characteristic UPC (for example, as captured by a suitable sensor when applying the material-based security marking) of this marking is preferably made part of the component digital data D in the secure marking of this component, and a corresponding reference unique physical signature data UPS is calculated (for example, by taking a hash of the digital data UPC, i.e. UPS=H(UPC)) and may also be part of the component digital data. This additional level of security improves the security provided by the unique serial number marked on the component by its manufacturer. Preferably, the reference UPC and UPS are stored in the blockchain (to make them immutable) and are accessible to the technician. Moreover, these reference values may also be further stored in the memory of the technician's computer in order to allow offline authentication of the material-based security marking on the highly critical component.

The further offline operation of authentication of this material-based security marking may comprise measuring the unique physical characteristic on the component, by means of a suitable sensor connected to the computer, and obtaining a candidate unique physical characteristic digital data $UPC^c$ from the measured characteristic (for example, via a specific application programmed in the CPU of his computer). Then, the technician (or the CPU of his computer, if suitably programmed) compares the obtained $UPC^c$ with the copy of the reference UPC stored in the memory of the computer: in case of "reasonable" matching $UPC^c \approx UPC$ (i.e. within some predefined error tolerance criterion), the material-based security marking, and thus the component, are considered as genuine.

As above mentioned, a copy of the reference physical characteristic digital data UPC, instead of being stored in the memory of the technician's computer, is part of the article digital data D included in the security marking applied on the component and can be obtained by direct reading on the security marking (with the reader). The technician may then read the candidate $UPC^c$ on the security marking and check that the signature UPS stored in the memory of the computer matches the candidate signature $UPS^c$ calculated from the read candidate $UPC^c$ by computing $UPS^c=H(UPC^c)$: in case of matching $UPS^c=UPS$, the material-based security marking, and thus the component, are confirmed as being genuine.

In a variant of the embodiment, the checking of authenticity of a component by a technician may alternatively be performed via online process in a similar way as already explained with the first detailed embodiment of the invention, and will not be repeated here.

According to the invention, it is further possible to verify the conformity of a digital image of a secured document, like an aircraft component identification document AC-ID: $A_{125}$ for example, with respect to the original secured document. Indeed, if a technician in charge of control (or repair) operations has only access to a digital image of the secured document, for example by receiving the image of AC-ID: $A_{125}$ on its reader (which may be, for example, a smartphone suitably programmed), he nevertheless can check that the component data printed on the received image of the document correspond to that of the original document by performing the following operations of:

reading the component digital data $D_{125}$ and the verification key $k_{125}$ on the image of the security marking 310 on the digital image of the document AC-ID: $A_{125}$;

acquiring a reference batch value B of the batch corresponding to the document AC-ID: $A_{125}$; this reference value may be already in the memory of the reader (or the computer connected to the reader) or may be acquired via a communication link from a database storing the reference batch values of aircraft components in case the reader is equipped with a communication unit, by sending a request containing, for example, the component (unique) serial number or merely the key $k_{125}$ read of the image of the security marking 310, and receiving back the corresponding reference batch value B;

calculating (with the programmed one-way function H) a component digital signature $x_{125}$ from the read component digital data $D_{125}$, with $x_{125}=H(D_{125})$;

calculating a candidate batch value (by means of the programmed one-way accumulator and its corresponding operator $\otimes$) $B^c$ with $B^c=k_{125}\otimes x_{125}$; and verifying that the candidate batch value $B^c$ matches the reference batch value B.

The above mentioned operations of verification of conformity may also be performed on a mere photocopy of an original document AC-ID125: indeed, even if an anti-copy feature were on the security marking of the original document that would reveal that the technician has just a photocopy, he nevertheless could read the data on the security marking on the photocopy and perform the above operations of verification of conformity of the data read on the copy with respect to the original data.

Figure 4:
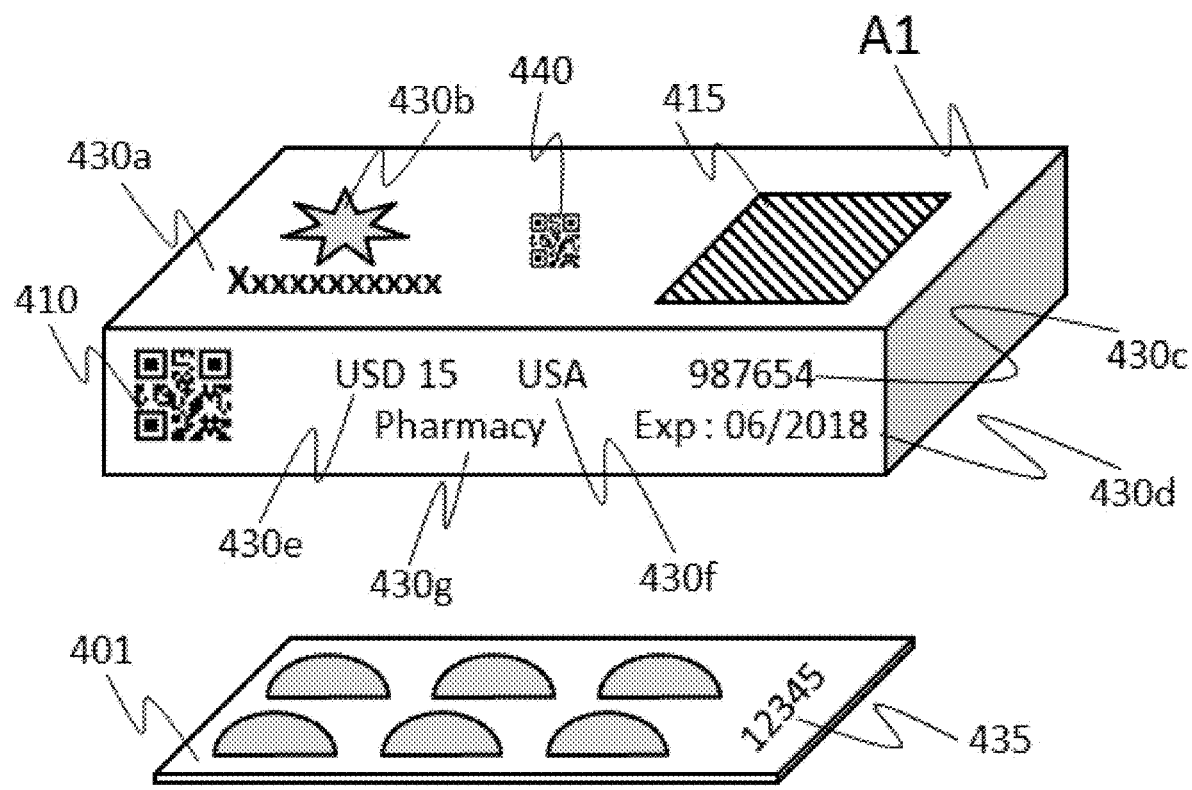
FIG. 4 illustrates a batch of pharma products secured according to the invention.

Another illustrative embodiment of the invention relates to self-secure serialization of pharmaceutical products like medicine packs, as shown on FIG. 4. This embodiment relates to a production batch of medicine packs of a given type of medicament comprising E boxes (or articles) $A_1$, $A_2$ ... $A_\mu$. In this illustrative example of a typical box $A_1$ shown on FIG. 4, tablets for patients are packaged in a set of serialized blister packs 401 (only one is shown) contained in the box $A_1$. Each blister pack 401 is marked with a unique serial number 435 (here, 12345, applied by the manufacturer), and the box $A_1$ has conventional information printed on it like the name of the medicine 430a, a logo 430b, a box unique serial number (box ID) 430c, an expiry date 430d. In this example, additional conventional data are possibly printed on the box (or, in a variant, on a package leaflet put in the box A1): a recommended retail price 430e, a market country 430f, and a sale restriction indication 430g (e.g. to be sold only in pharmacy). The box $A_1$ is secured by means of a machine readable security marking 410 in the form of a printed 2D barcode (or datamatrix) and further secured with a material-based security marking in the form of a separate tamperproof adhesive anti-copy stamp 415 including randomly dispersed particles which is applied on the box $A_1$. The (random and thus unique) positions of the particles on the stamp in fact are known to constitute a unique physical characteristic of the stamp 415 applied on the box $A_1$, and thus here also a unique physical characteristic of the box $A_1$ itself. The detected positions of the dispersed particles on the stamp 415 are conventionally used to calculate corresponding reference unique physical characteristic digital data UPC-$A_1$ of the box $A_1$. Usually, the detection of the dispersed particles, and their positions, is performed via image processing of a digital image of the stamp. Here, the particles can be detected upon illumination of the stamp with a mere white flash (a white LED for example), like the flash of a smartphone for example. Preferably, a specific image processing application can be downloaded on a smartphone to make it capable to image a stamp 415, detect the positions of the dispersed particles and calculate from these positions a corresponding unique physical characteristic digital data UPC.

According to the invention, the barcode 410 of a box $A_i$ (i∈{1, ... , ▫}) of the batch contains box digital data $D_i$ corresponding to a digital representation of the above mentioned conventional data 430a-430g of the box $A_i$, the respective serial numbers 435 of the blister packs 401 contained in the box $A_i$, and the reference unique physical characteristic digital data UPC-$A_i$ of the box $A_i$. For each box $A_i$ of the batch, an associated box digital signature $x_i$ of its box digital data $D_i$ is calculated by means of a one-way hash function H as $x_i=H(D_i)$, i=1, ... , ▫. Let X designates the set of all the box digital signatures of the batch, $X=(x_1, ... , x_\mu)$, and $X^i$ the set of all the box digital signatures except for signature $x_i$, i.e. $X^i=(x_1, x_2, ... *x_{i-1}, x_{i+1}, ... , x_\mu)$. A reference aggregated digital signature B for all the boxes of the batch is then calculated by means of a one-way accumulator f (and its corresponding operator ⊗) as B=f(X).

For example, the one-way accumulator f may correspond to the above mentioned operator ⊗ indicating a (not only quasi-commutative but also commutative) modular multiplication modulo a given modulus m (i.e. a⊗b=a*b mod m) with f(x)=X mod m and:

$$f(X)=f(f(f(\ldots f(f(f(x_1),x_2),x_3),\ldots,x_{\mu-2}),x_{\mu-1}),x_\mu)=f$$
$$(x_1\otimes x_2\otimes x_3\otimes\ldots\otimes x_\mu)=f(x_1)\otimes f(x_2)\otimes f(x_3)\otimes\ldots$$
$$\otimes f(x_\mu)=(x_1 \bmod m)*(x_2 \bmod m)*\ldots*(x_\mu \bmod m)=x_1*x_2*\ldots*x_\mu \bmod m=x_1\otimes x_2\otimes\ldots\otimes x_\mu,$$

or may correspond to the operator ⊗ indicating a quasi-commutative exponentiation modulo the modulus m (i.e.) $a\otimes b=a^b \bmod m$), with $f(x)\equiv f(I; x)=I^x \bmod m$ (I being a given integer) and:

$$f(X)\equiv f(I;X)=f(f(f(\ldots f(f(f(x_1),x_2),x_3),\ldots,x_{\mu-2}),x_{\mu-1}),$$
$$x_\mu)=f(I;x_1\otimes x_2\otimes x_3\otimes\ldots\otimes x_\mu)=I\otimes\Pi x_i=(I^{\Pi x_i})\bmod m, \text{ and } \Pi x_i=x_1*x_2*\ldots*x_\mu.$$

The obtained reference aggregated digital signature B is then either published in a media accessible to a user having to check the validity of a secured medicine pack $A_i$, or stored in a searchable aggregated signature database accessible to the user, or stored in a blockchain (or in a database secured by a blockchain) accessible to the user. For example, the user may send a request containing the serial number 430c, read on the security marking 410 on said box $A_i$, to the searchable database or blockchain and receive back the corresponding batch value B. A link to access the searchable aggregated signature database (via the web, for example), or the blockchain, may be included in a box data marking 440 (shown as a QR code on FIG. 4) printed on the box $A_i$. Preferably, the reference aggregated digital signature B is made available to the user locally, so that the user can perform the checking operations on offline mode (i.e. by not having to access distant storage means to obtain B): for example, the user has a reader such as a smartphone capable to read and decode the data in the security marking 410 on box $A_i$ (by means of a programed application operable to run on the smartphone's CPU) and of which memory stores the reference aggregated digital signature B.

To each box $A_i$. of the batch of μ medicine packs correspond a verification key $k_i$ calculated by means of the partial one-way accumulator f according to the formula $k_i=f(X^i)=f(f(f(\ldots f(f(f(x_1), x_2), x_3), \ldots, x_{\mu-2}), x_{\mu-1}), x_\mu)$.

The box digital value $D_i$ and its corresponding box verification key $k_i$ (together constituting the verification information $V_i$ of box $A_i$) are part of the digital data included in the security marking 410 applied on box $A_i$.

If the symbol ⊗ designates the operator associated with the accumulator f, the verification of authenticity of the secured box $A_1$ of FIG. 4, belonging to the batch of boxes having the reference aggregated digital signature B, only necessitates to read and decode the box digital data $D_1$ on the security marking 410 on box $A_1$ (with appropriate reader, for example with the above mentioned smartphone having a further programmed application for calculating a signature with the one-way hash function H and a batch value with the operator ⊗ corresponding to the one-way accumulator f), calculating the corresponding box digital signature $x_1$ with the one-way function H as $x_1=H(D_1)$, obtaining the reference aggregated digital signature (batch value) B (in this example, the reference batch value B is stored in the memory of the reader), and checking if the obtained reference aggregated digital signature B matches the candidate aggregated digital signature $B^c$ obtained from the read verification information $(D_1, K_1)$ as $k_1\otimes x_1$. If $B^c \neq B$, the box $A_1$ is counterfeit. If $B^c=B$, the security marking 410 corresponds to that of a genuine box. In this case, several additional security checks can be performed. For example, with a reader equipped with a display (like the above mentioned smartphone), it is possible to extract from the read box digital data $D_1$ any one of the information 430a-430d, display the extracted information and visually check that it matches the corresponding information printed on the box $A_1$. If a displayed information does not correspond to a printed one, the box is counterfeit.

A further authentication check of the box $A_1$ is possible by verifying that the material-based security marking 415 is genuine. It suffices to detect the positions of the dispersed particles by imaging the stamp 415 (for example, with the above mentioned smartphone having image processing capabilities) and calculate from these positions a corresponding candidate unique physical characteristic digital data $UPC^c$–$A_1$, and then check that this $UPC^c$–$A_1$ is indeed similar (within a given margin of error) to the reference unique physical characteristic digital data $UPC^c$–$A_1$ extracted from the box digital data $D_1$: if they agree the stamp 415, and thus the box $A_1$, is genuine, if they do not agree the stamp 415, and thus the box $A_1$ (the stamp being tamperproof), is counterfeit.

Still in case of verified matching of the aggregated digital signatures (i.e. $B^c$=B), and even if the information 430a-430d have been verified and/or the material-based security marking 415 is genuine, it is further possible to check if the blister packs 401 contained in box $A_1$ are the right ones: it suffices to check if the unique serial numbers 435 marked on the blister packs match those indicated by the box digital data $D_1$ as read from the security marking 410. If these data do not match, this a proof of fraud: the blister packs of the genuine box $A_1$ have been replaced with other ones (possibly counterfeited, or of another mark, or corresponding to a different medicine). Moreover, still in case of an authentic box $A_1$ (i.e. with $B^c$=B), even if the blister packs 401 are the right ones, in case any one of the additional information extracted from the box digital data $D_1$: recommended retail price 430e, market country 430f, and sale restriction indication 430g, does not correspond to the experienced sale conditions (for example if the medicine pack $A_1$ is sold in a country different from that indicated by data 430f), the corresponding fraud can be detected. This further constitutes a serious alert that the batch itself, or at least a part of it, has been diverted.

Thus, both full track and trace operations and authentication checks of the secured medicine packs are possible due to the forgery-proof link provided according to the invention by the aggregated digital signature between the box data, the blister packs data of the contained blister packs, the unique characterizing physical properties of the box and its blister packs, and the belonging of the box to a given batch.

According to the above detailed description, the invention is clearly compatible with offline and local checking operations for verifying the authenticity of a secured article or conformity of data on an image (or copy) of a secured article with respect to the data associated with the original secured article. However, the invention is also compatible with online verification process, for example by receiving (via a communication link) a reference batch value form an external source (e.g. server or blockchain), or performing some or all the calculation steps involving the one-way function or the one-way accumulator via external computing means (e.g. operating on a server), or even performing the verification that a candidate aggregated digital signature matches a reference aggregated digital signature (and just receiving the result).

The above disclosed subject matter is to be considered illustrative, and not restrictive, and serves to provide a better understanding of the invention defined by the independent claims.

The invention claimed is:

1. Method A method of securing a given original article of a batch of a plurality of original articles against forgery or tampering, each original article of the batch having its own associated article data and corresponding article digital data, characterized by comprising the steps of:

for each original article of the batch, calculating by means of a one-way function an associated article digital signature of its corresponding article digital data;

calculating a reference aggregated digital signature corresponding to the batch of original articles from all the article digital signatures of the original articles of the batch by means of a one-way accumulator of said article digital signatures, and making available to a user the reference aggregated digital signature;

determining an article verification key corresponding to the article digital signature of said given original article by means of a partial one-way accumulator of all the other article digital signatures used for calculating the reference aggregated digital signature, whereby a candidate article digital signature corresponds to that of an original article of the batch only if the reference aggregated digital signature is calculated from said candidate article digital signature and corresponding article verification key by means of the one-way function; and applying on the given original article a corresponding machine readable security marking including a representation of its associated article digital data and its corresponding article verification key, thereby obtaining a marked original article of which article data is secured against forgery or tampering.

2. The method according to claim 1, wherein the reference aggregated digital signature associated with the batch of original articles is either published in a media accessible to the user, or stored in a searchable aggregated signature database accessible to the user, or stored in a blockchain, or in a database secured by a blockchain, accessible to the user.

3. The method according to claim 2, wherein the marked original article further comprises aggregated signature access data marked thereto and containing information sufficient to access to the reference aggregated digital signature corresponding to the batch of original articles, said information being a link to an aggregated signature acquisition interface of, respectively, one of the following:

the media wherein the reference aggregated digital signature is published, the media being accessible to the user via said aggregated signature acquisition interface operable to receive from the user an aggregated signature request containing article data, or a digital signature of said article data, obtained from a security marking of a marked original article, and send back a reference aggregated digital signature of associated batch;

the searchable aggregated signature database wherein the reference aggregated digital signature is stored, the aggregated signature database being accessible to the user via said aggregated signature acquisition interface operable to receive from the user an aggregated signature request containing article data, or a digital signature of said article data, obtained from a security marking of a marked original article, and send back a reference aggregated digital signature of associated batch;

the blockchain, respectively the database secured by the blockchain, wherein the time-stamped aggregated digital signature is stored, the blockchain, respectively the database secured by the blockchain, being accessible to the user via said aggregated signature acquisition interface operable to receive from the user an aggregated signature request containing article data, or a digital signature of said article data, obtained from a security marking of a marked original article, and send back a reference aggregated digital signature of associated batch.

4. The method according to claim 1, wherein
a virtual article is included into the batch of original articles, said virtual article having associated virtual article data and its corresponding virtual article digital data, and an associated virtual article digital signature obtained by means of the one-way function, said virtual article being not produced but only used for generating the associated virtual article digital signature from the corresponding virtual article digital data; and
the reference aggregated digital signature associated with said batch of original articles being calculated from all the article digital signatures of the original articles of the batch, including the virtual article digital signature, by means of the one-way accumulator.

5. The method according to claim 1, wherein
the one-way function is a hash function and an article digital signature of an original article is a sequence of a given plurality of bits of lower weights selected from the bits of a hash value of the corresponding article digital data.

6. The method according to claim 1, wherein
additional article digital data corresponding to the article data associated with the marked original article are stored in a searchable information database accessible to the user via an information database interface operable to receive from the user an information request containing article data, or corresponding digital signature data, obtained from a security marking of a marked original article, and send back corresponding additional article digital data.

7. The method according to claim 1, wherein the marked original article further comprises a corresponding article data marking applied thereto, said article data marking including the corresponding article data associated with said marked original article.

8. The method according to claim 1, wherein the article digital data of the marked original article includes reference physical characteristic digital data UPC of a corresponding unique physical characteristic of the marked original article, or of an associated object or individual.

9. The method according to claim 8, wherein the unique physical characteristic of the marked original article is that of a material-based security marking applied on the original article.

10. A method of verifying the authenticity of an article secured according to the method of claim 1, or the conformity of a copy of such secured article with respect to the original one, characterized by comprising the steps of, upon viewing a test object being said article or said copy of the article:
acquiring a digital image of the security marking on the test object by means of an imager having an imaging unit, a CPU with a memory, and an image processing unit;
reading a representation of article digital data and of an associated article verification key on the acquired digital image of the security marking on the test object, and extracting respectively corresponding article digital data and article verification key from said read representation;
having stored in the memory a reference aggregated digital signature of a corresponding batch of articles, and having programmed in the CPU the one-way function and the one-way accumulator;
verifying that the extracted article digital data and associated article verification key indeed correspond to the stored reference aggregated digital signature by performing the steps of:
calculating a digital signature of the extracted article digital data with the one-way function;
calculating a candidate aggregated digital signature from the calculated digital signature of the extracted article digital data and the extracted article verification key with the one-way accumulator; and
checking that the obtained candidate aggregated digital signature matches the stored reference aggregated digital signature,
whereby, in case said aggregated digital signatures match, the article data on the test object is that of a genuine original article.

11. The method according to claim 10, wherein the article is secured by storing the reference aggregated digital signature associated with the batch of original articles in a searchable aggregated signature database, wherein the reference aggregated digital signature associated with the batch of original articles is either published in a media accessible to the user, or stored in a searchable aggregated signature database accessible to the user, or stored in a blockchain, or in a database secured by a blockchain, accessible to the user, and the imager is further equipped with a communication unit operable to send and receive back data via a communication link, comprising the steps of:
sending with the communication unit via the communication link a request to said aggregated signature database, and receiving back the reference aggregated digital signature associated with the batch of original articles; and
storing the received aggregated digital signature in the memory of the imager, which precede the step of acquiring the digital image of the security marking.

12. The method according to claim 10, wherein the reference aggregated digital signature associated with the batch of original articles is either published in a media accessible to the user, or stored in a searchable aggregated signature database accessible to the user, or stored in a blockchain, or in a database secured by a blockchain, accessible to the user,
wherein the marked original article further comprises aggregated signature access data marked thereto and containing information sufficient to access to the reference aggregated digital signature corresponding to the batch of original articles, said information being a link to an aggregated signature acquisition interface of, respectively, one of the following:
the media wherein the reference aggregated digital signature is published, the media being accessible to the user via said aggregated signature acquisition interface operable to receive from the user an aggregated signature request containing article data, or a digital signature of said article data, obtained from a security marking of a marked original article, and send back a reference aggregated digital signature of associated batch;
the searchable aggregated signature database wherein the reference aggregated digital signature is stored, the aggregated signature database being accessible to the user via said aggregated signature acquisition interface operable to receive from the user an aggregated signature request containing article data, or a digital signature of said article data, obtained from a security marking of a marked original article, and send back a reference aggregated digital signature of associated batch;
the blockchain, respectively the database secured by the blockchain, wherein the time-stamped aggregated digital signature is stored, the blockchain, respectively the database secured by the blockchain, being accessible to the user via said aggregated signature acquisition interface operable to receive from the user an aggregated signature request containing article data, or a digital signature of said article data, obtained from a security marking of a marked original article, and send back a reference aggregated digital signature of associated batch,
and the imager is further equipped with a communication unit operable to send and receive back data via a communication link, comprising the steps of:
reading the aggregated signature access data marked on the test object with the imager;
sending with the communication unit via the communication link an aggregated signature request to said aggregated signature acquisition interface containing the article data, or a digital signature of said article data, obtained from the security marking on the test object, and receiving back a corresponding reference aggregated digital signature of an associated batch; and
storing the received aggregated digital signature in the memory of the imager,
which precede the step of acquiring the digital image of the security marking.

13. The method according to claim 10, wherein additional article digital data corresponding to the article data associated with the marked original article are stored in a searchable information database accessible to the user via an information database interface operable to receive from the user an information request containing article data, or corresponding digital signature data, obtained from a security marking of a marked original article, and send back corresponding additional article digital data, and the imager is further equipped with communication means operable to send to the information database interface an information request containing article data, or corresponding digital signature data, obtained from the security marking on the test object, and receive back corresponding additional article digital data.

14. The method according to claim 10, wherein the marked original article further comprises a corresponding article data marking applied thereto, said article data marking including the corresponding article data associated with said marked original article, comprising the further steps of:
reading article data marked on an article data marking on the test object with the imager; and
checking that the article data read from the article data marking correspond with the article digital data extracted from the security marking on the test object.

15. The method according to claim 10, wherein the article digital data of the marked original article includes reference physical characteristic digital data UPC of a corresponding unique physical characteristic of the marked original article, or of an associated object or individual, and the imager is further equipped with a sensor operable to detect a unique physical characteristic of a marked original article, or of an associated object or individual, and the CPU is programmed to extract corresponding unique physical characteristic digital data from a detection signal received from the sensor, the imager having stored in the memory reference physical characteristic digital data UPC corresponding to said unique physical characteristic of the marked original article, or of the associated object or individual, comprising the further steps of, upon viewing a subject being said article or said associated object or individual:
detecting with the sensor a unique physical characteristic of the subject and extracting corresponding candidate unique physical characteristic digital data $UPC^c$,
comparing the obtained candidate unique physical characteristic digital data $UPC^c$ with the stored reference physical characteristic digital data UPC; and
in case the candidate unique physical characteristic digital data $UPC^c$ is similar to the stored reference physical characteristic digital data UPC, within a given tolerance criterion, the subject is considered as genuine.

16. A marked article belonging to a batch of a plurality of original articles and secured against forgery or tampering according to the method of claim 1, each original article of the batch having its own associated article data and corresponding article digital data, said batch having a corresponding reference aggregated digital signature, comprising:
a machine readable security marking applied on it and including a representation of its associated article digital data and a corresponding article verification key.

17. The marked article according to claim 16, wherein the article digital data of the marked article include reference physical characteristic digital data UPC of a corresponding unique physical characteristic of the marked article, or of an associated object or individual.

18. The marked article according to claim 17, wherein the unique physical characteristic of the marked article is that of a material-based security marking applied on the marked article.

19. A system for verifying the authenticity of a marked original article secured according to the method of claim 1, or the conformity of a copy of such article with respect to the original one, comprising an imager having an imaging unit, a CPU with a memory, and an image processing unit, the memory storing a reference aggregated digital signature of a corresponding batch of articles, and the one-way function and the one-way accumulator being programmed in the CPU, operable to:
acquire a digital image of the security marking on a test object being said article or said copy of the article;
read a representation of article digital data and of an associated article verification key on the acquired digital image of the security marking on the test object, and extract respectively corresponding article digital data and article verification key from said read representation;
verify that the extracted article digital data and associated verification key indeed correspond to the stored reference aggregated digital signature by executing on the CPU the further programmed steps of:
calculating a digital signature of the extracted article digital data with the one-way function;
calculating a candidate aggregated digital signature from the calculated digital signature of the extracted article digital data and the extracted verification key with the one-way accumulator; and
checking that the obtained candidate aggregated digital signature matches the stored reference aggregated digital signature,
whereby, in case said aggregated digital signatures match, the system is operable to deliver an indication that the article data on the test object is that of a genuine original article.

20. The system according to claim 19, for verifying an article, wherein the article digital data of the marked original article includes reference physical characteristic digital data UPC of a corresponding unique physical characteristic of the marked original article, or of an associated object or individual, and wherein the imager is further equipped with a sensor operable to detect a unique physical characteristic of a marked original article, or of an associated object or individual, and the CPU is programmed to extract corresponding unique physical characteristic digital data from a detection signal received from the sensor, the imager having stored in the memory reference physical characteristic digital data UPC corresponding to said unique physical characteristic of the marked original article, or of associated object or individual, the system being further operable to:
- detect with the sensor a unique physical characteristic of a subject being said article or said associated object or individual, and extract corresponding candidate unique physical characteristic digital data $UPC^c$;
- compare the obtained candidate unique physical characteristic digital data $UPC^c$ with the stored reference physical characteristic digital data UPC; and
- in case the candidate unique physical characteristic digital data $UPC^c$ is similar to the stored reference physical characteristic digital data UPC, within a given tolerance criterion, deliver an indication that the subject is considered as genuine.

\* \* \* \* \*